(12) United States Patent
Kuramochi et al.

(10) Patent No.: US 7,673,949 B2
(45) Date of Patent: Mar. 9, 2010

(54) ELECTRICALLY POWERED BRAKE SYSTEM AND CONTROL UNIT FOR ELECTRICALLY POWERED BRAKE SYSTEM

(75) Inventors: Yuichi Kuramochi, Hitachinaka (JP); Toshiyuki Innami, Mito (JP)

(73) Assignee: Hitachi, Ltd., Tokyo (JP)

( * ) Notice: Subject to any disclaimer, the term of this patent is extended or adjusted under 35 U.S.C. 154(b) by 814 days.

(21) Appl. No.: 11/339,576

(22) Filed: Jan. 26, 2006

(65) Prior Publication Data
US 2006/0163939 A1 Jul. 27, 2006

(30) Foreign Application Priority Data
Jan. 27, 2005 (JP) ............................. 2005-019851
Jan. 23, 2006 (JP) ............................. 2006-014100

(51) Int. Cl.
*B60T 8/88* (2006.01)
(52) U.S. Cl. ................................. 303/122.03
(58) Field of Classification Search .................. 303/122, 303/122.03, 122.08, 122.1, 122.14
See application file for complete search history.

(56) References Cited

U.S. PATENT DOCUMENTS 5,266,773 A    11/1993   Granborg et al.
6,315,092 B1   11/2001   Schwarz
6,663,195 B1   12/2003   Arnold
2003/0066719 A1  4/2003   Watanabe et al.

FOREIGN PATENT DOCUMENTS

EP    924 128       6/1999
JP    2003014014 A  1/2003

*Primary Examiner*—Xuan Lan Nguyen
(74) *Attorney, Agent, or Firm*—Mattingly & Malur, P.C.

(57) ABSTRACT

An electrically powered brake system capable of performing a self-diagnosis of elements of the electrically brake system to diagnose a failure before a vehicle is driven is provided. The electrically powered brake system having a parking brake having a conversion mechanism 6 converting a rotary motion of a motor 2 into a linear motion, propelling a piston 7 according to the rotation of a rotor 2A of the motor 2 by the conversion mechanism, pressing brake pads 3 and 4 against a disc rotor 5 by the piston to generate a braking force, and retaining the braking force by a locking mechanism 10 has a control unit 20 performing a diagnosis of elements constituting the system during actuation of the parking brake. The control unit performs a diagnosis of a fail safe relay 26 receiving the supply of electric power of the motor, and performs diagnoses of a braking force sensor 8, a rotation angle detecting sensor 9 and a current sensor.

5 Claims, 14 Drawing Sheets

ELECTRICALLY POWERED BRAKE SYSTEM AND CONTROL UNIT FOR ELECTRICALLY POWERED BRAKE SYSTEM

BACKGROUND OF THE INVENTION

1. Field of the Invention

The present invention relates to a brake system which is used in an automobile or the like, and particularly to an electrically powered brake system electrically generating a braking force and a control unit performing a failure diagnosis of the electrically powered brake system.

2. Background Art

As a fail-safe for a failed wheel which suffered a failure of a control system including software and hardware in an electrically powered brake using a motor as a braking force source, fail-open functions of removing a braking force of the failed wheel to prevent a vehicle from being braked have been proposed. The mechanical specifics of these functions are disclosed in Patent Document 1 (JP Patent Publication (Kokai) No. 2003-14014) and others. They are based on a method in which an electrically powered brake actuator is made to completely stop control and input of electrical energy is blocked to remove a braking force.

[Patent Document 1] JP Patent Publication (Kokai) No. 2003-14014

However, the operation of the fail safe described in Patent Document 1 is actuated only in a state in which a failure is detected and controllability becomes worse when brake control is performed during activation of a brake system (including a time during which a vehicle is driven). In an automobile, generally, each of four wheels is equipped with a brake. In case where a braking force is generated on only a specific wheel while a vehicle is driven, a yaw moment is generated in the vehicle with an axis being the wheel on which the braking force is generated. This yaw moment may bend a traveling direction of a vehicle depending on the speed of the vehicle and the situation of a road surface.

In an electrically powered brake system, how a brake can be released without generating a false thrust force due to a failure or a malfunction is an important point for whether or not the traveling direction of a vehicle can be controlled according to a handle operation by a driver.

SUMMARY OF THE INVENTION

An object of the present invention is to preclude generation of an unintended braking force by performing a diagnosis of each part of an electrically powered brake to diagnose a failure in advance during actuation of a parking brake in an electrically powered brake system using a motor for a braking force source.

For achieving the aforementioned object, the electrically powered brake system according to the present invention is an electrically powered brake system having a parking brake mechanism having a conversion mechanism converting a rotary motion of a motor into a linear motion, propelling a piston according to the rotation of the rotor of the motor by the conversion mechanism, pressing a brake pad against a disc rotor by the piston to generate a braking force, and retaining the braking force by a locking mechanism, wherein the system comprises a diagnosis means performing a diagnosis of elements constituting the system during actuation of the parking brake. For the conversion mechanism converting a rotary motion into a linear motion, a ball ramp mechanism, a ball screw mechanism or the like may be used as appropriate.

Since the electrically powered brake system of the present invention configured as described above performs a diagnosis of elements constituting the electrically powered brake system to detect an abnormality during actuation of the parking brake, a failure location can be diagnosed before a vehicle is driven, and generation of an unintended braking force during driving can be prevented. As a result, safe driving of a vehicle can be achieved.

As a preferable aspect of the electrically powered brake system, the motor is supplied with a voltage from an electric power supply via switching means such as a relay as the element, and the diagnosis means performs a diagnosis of the switching means. The electrically powered brake system configured as such can perform a diagnosis of switching means such as a relay for supplying an electric power from the electric power supply to the motor to detect a failure, thus making it possible to prevent a braking force abnormality by a failure of the switching means when a vehicle is driven.

As a preferable specific aspect of the electrically powered brake system, the electrically powered brake system has a braking force sensor and/or a motor rotation detecting sensor as the element, and the diagnosis means performs a diagnosis of the braking force sensor and/or the motor rotation detecting sensor. The electrically powered brake system configured as such can perform a diagnosis of the braking force sensor or the motor rotation detecting sensor to diagnose a failure of the braking force sensor or the motor rotation detecting sensor during actuation of the parking brake, thus making it possible to prevent a braking force abnormality by a failure of these sensors when a vehicle is driven.

Further, as another preferable specific aspect of the electrically powered brake system, the electrically powered brake system has as the element a current sensor on wiring for supplying a voltage from the electric power supply to the motor, and the diagnosis means performs a diagnosis of the current sensor. The electrically powered brake system configured as such can perform a diagnosis of the current sensor to diagnose a failure of the current sensor during actuation of the parking brake, thus making it possible to prevent a braking force abnormality by a failure of the current sensor when a vehicle is driven.

A method for diagnosing a failure of an electrically powered brake system is a method for diagnosing a failure of an electrically powered brake system comprising a parking brake having a conversion mechanism converting a rotary motion of a motor into a linear motion, propelling a piston according to the rotation of the rotor of the motor by the conversion mechanism, pressing a brake pad against a disc rotor by the piston to generate a braking force, and retaining the braking force by a locking mechanism, the method comprising the steps of: actuating the parking brake by the locking mechanism; and performing a diagnosis of elements constituting the electrically powered brake system. Namely, a diagnosis of the elements is performed in a state in which the parking brake is applied.

As a preferable specific aspect of the method for diagnosing a failure of an electrically powered brake system, in the diagnosing step, switching means for supplying a voltage to the motor as the element is turned off, a current is made to pass through the motor, and a terminal voltage of the switching means is then measured to perform a diagnosis. As another preferable specific aspect of the method for diagnosing a failure of an electrically powered brake system, in the diagnosing step, the motor is further rotated to increase a braking force, and a diagnosis of a braking force sensor and/or a motor rotation detecting sensor as the element is performed, and further, a current of a defined value is made to pass through the motor, and the current value of the motor is compared with a predefined threshold to perform a diagnosis of a current sensor as the element.

In the method for diagnosing a failure of an electrically powered brake system, configured as such, a diagnosis of elements such as, for example, switching means, a braking force sensor, a motor rotation detecting sensor and a current sensor is performed after the parking brake is actuated by the locking mechanism, and therefore when a vehicle or the like equipped with the electrically brake system is at rest, a diagnosis of the elements can be performed to prevent a failure before the vehicle is driven.

According to the first aspect of the present invention, the electrically powered brake control unit controlling an electrically powered break system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, and switching means for supplying or interrupting electric power supplied to the electrically powered actuator based on a command from outside, wherein the electrically powered brake control unit comprises: a parking brake mechanism control section outputting a command for retaining or releasing the braking force by the parking brake mechanism based on a parking brake actuation command; a switching means failure detecting section detecting a failure of the supply or interruption of electric power by the switching means in response to the retaining command of the parking brake mechanism control section; and a switching means failure outputting section outputting the result of detection by the switching means failure detecting section to outside the electrically powered brake control unit.

With the use of the electrically powered brake control unit, configured as such, a parking brake mechanism control section outputs a command for retaining or releasing based on a parking brake actuation command, a switching means failure detecting section detects a failure of the supply or interruption of electric power by the switching means in response to the retaining command, and a switching means failure outputting section outputs the result to outside the electrically powered brake control unit. Thus, a switching means failure can be informed a driver or the like immediately.

According to the second aspect of the present invention, the electrically powered brake control unit controlling an electrically powered break system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, switching means for supplying or interrupting electric power supplied to the electrically powered actuator based on a command from outside, and a rotation angle sensor detecting a rotation angle of the electrically powered actuator, wherein the electrically powered brake control unit comprises: a parking brake actuation determining section detecting actuation of a parking brake by the locking mechanism based on the result of detection of the rotation angle sensor; a switching means failure detecting section detecting a failure of the supply or interruption of electric power by the switching means when the parking brake actuation determining section detects actuation of the parking brake; and a switching means failure outputting section outputting the result of detection by the switching means failure detecting section to outside the electrically powered brake control unit.

With the use of the electrically powered brake control unit, configured as such, the parking brake actuation determining section detects actuation of a parking brake by the locking mechanism based on the result of detection of the rotation angle sensor, and the switching means failure detecting section detects a failure of the supply or interruption of electric power thereupon and outputs the results of detection to the outside of the electrically powered brake control unit. Thus, a switching means failure can be positively determined and informed a driver or the like.

Preferably, the electrically powered brake control unit comprises a current control section controlling a current supplied to the electrically powered actuator, and the switching means failure detecting section comprises: a voltage detecting section detecting a voltage value of an electric power supply line connecting the switching means to the electrically powered actuator; and a switching means interruption failure detecting section outputting an electric power interruption command to the switching means in response to the retaining command of the parking brake mechanism control section, supplying a predetermined current to the electrically powered actuator by the current control section, and detecting a failure of the interruption of electric power by the switching means based on the result of detection by the voltage detecting section. The electrically powered brake control unit configured as such can certainly detect a failure of switching means such as a relay.

In the electrically powered brake control unit, preferably, the electrically powered actuator is an alternating current motor, and the predetermined current is a q axis current increasing the braking force of the brake pad. Switching means interruption failure can be detected by supplying a q axis current to an alternating current motor, and increasing the braking force. Also, the electrically powered actuator is an alternating current motor, and the predetermined current is a predetermined d axis current. Switching means interruption failure can be detected by supplying a d axis current which does not increase the braking force.

According to the third aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, a rotation angle sensor detecting a rotation angle of the electrically powered actuator, and a braking force sensor detecting the braking force of the brake pad, wherein the electrically powered brake control unit comprises: a parking brake actuation determining section detecting actuation of the parking brake by the locking mechanism based on the result of detection by the braking force sensor; a rotation angle sensor failure detecting section detecting a failure of the rotation angle sensor when the parking brake actuation determining section detects actuation of the parking brake; and a rotation angle sensor failure outputting section outputting the result of detection by the rotation angle sensor failure detecting section to outside the electrically powered brake control unit.

With the use of the electrically powered brake control unit, configured as such, the parking brake actuation determining section detects actuation of the parking brake by the locking mechanism based on the result of detection, and the rotation angle sensor failure detecting section detecting a failure of the rotation angle sensor and outputs the results of detection to the outside of the electrically powered brake control unit. Thus, a driver or the like can easily determined the failure of the electrically powered brake system.

Preferably, the electrically powered brake control unit comprises a current control section controlling a current supplied to the electrically powered actuator, the rotation angle sensor failure detecting section has a storage section storing a rotation angle when the parking brake actuation determining section detects actuation of the parking brake, the current control section supplies a predetermined current to the electrically powered actuator, and a failure of the rotation angle sensor is detected based on a comparison between the rotation angle stored in the storage section and the rotation angle of the rotation angle sensor after the supply of the predetermined current. In the electrically powered brake control unit, preferably, the electrically powered actuator is an alternating current motor, and the predetermined current has a current value leading to a braking force greater than a braking force retained by the parking brake mechanism, and less than a maximum braking force tolerated by the electrically powered brake system, and it is a q axis current.

According to the fourth aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, a rotation angle sensor detecting a rotation angle of the electrically powered actuator, and a braking force sensor detecting the braking force of the brake pad, wherein the electrically powered brake control unit comprises: a parking brake actuation determining section detecting actuation of a parking brake by the locking mechanism based on the result of detection of the rotation angle sensor; a braking force sensor failure detecting section detecting a failure of the braking force sensor when the parking brake actuation determining section detects actuation of the parking brake; and a braking force sensor failure outputting section outputting the result of detection by the braking force sensor failure detecting section to outside the electrically powered brake control unit.

With the use of the electrically powered brake control unit, configured as such, the parking brake actuation determining section detects actuation of a parking brake based on the result of detection of the rotation angle sensor; the braking force sensor failure detecting section detects a failure of the braking force sensor; and the braking force sensor failure outputting section outputs the results of detection to the outside of the electrically powered brake control unit. Thus, the failure of the braking force sensor can be effectively judged within a short period of time.

Preferably, the electrically powered brake control unit comprises a current control section controlling a current supplied to the electrically powered actuator, the braking force sensor failure detecting section has a storage section storing a braking force when the parking brake actuation determining section detects actuation of the parking brake, the current control section supplies a predetermined current to the electrically powered actuator, and a failure of the braking force sensor is detected based on a comparison between the braking force stored in the storage section and the braking force of the braking force sensor after the supply of the predetermined current. In the electrically powered brake control unit, preferably, the electrically powered actuator is an alternating current motor, and the predetermined current has a current value leading to a braking force greater than a braking force retained by the parking brake mechanism and less than a maximum braking force tolerated by the electrically powered brake system, and it is a q axis current.

According to the fifth aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, a rotation angle sensor detecting a rotation angle of the electrically powered actuator, a braking force sensor detecting the braking force of the brake pad, and switching means for supplying or interrupting electric power supplied to the electrically powered actuator based on a command from outside, the electrically powered brake control unit being supplied with electric power from an electric power supply via the switching means, wherein the electrically powered brake control unit comprises: a sensor failure detecting section detecting a failure of the braking force sensor and/or the rotation angle sensor in response to reception of a parking range command signal of a shift change lever; a switching means interruption failure detecting section performing a failure diagnosis on whether the supply of electric power to the electrically powered actuator can be interrupted by the switching means when the sensor failure detecting section detects that the sensors do not fail; and a failure outputting section outputting the result of detection by the sensor failure detecting section or the switching means interruption failure detecting section to outside the electrically powered brake control unit.

Preferably, the electrically powered brake control unit comprises a parking brake mechanism control section actuating the parking brake mechanism, when the sensor failure detecting section and the switching means interruption failure detecting section did not detect any failure. When the shift change lever is selected to the parking range, the sensor failure detecting section detects a failure of the braking force sensor and the rotation angle sensor. If no failure is detected, the electrically powered brake control unit, configured as such, evaluates whether or not the switching means interruption failure detecting section can interrupt the supply of electric power from the switching means and outputs the results of detection and evaluation. Thus, various types of failure of the electrically powered brake control unit can be detected within a short period of time.

According to the sixth aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, a rotation angle sensor detecting a rotation angle of the electrically powered actuator, a braking force sensor detecting the braking force of the brake pad, and switching means for supplying or interrupting electric power supplied to the electrically powered actuator based on a command from outside, the electrically powered brake control unit being supplied with electric power from an electric power supply via the switching means, wherein the electrically powered brake control unit comprises: a parking brake mechanism control section outputting a command for retaining or releasing the braking force by the parking brake mechanism based on a parking brake actuation command; a sensor failure detecting section detecting a failure of the braking force sensor and/or the rotation angle sensor in response to the retaining command of the parking brake mechanism control section; a switching means interruption failure detecting section performing a failure diagnosis on whether the supply of electric power to the electrically powered actuator can be interrupted by the switching means when the sensor failure detecting section detects that the sensors do not fail; and a failure outputting section outputting the result of detection by the sensor failure detecting section or the switching means interruption failure detecting section to outside the electrically powered brake control unit.

With the use of the electrically powered brake control unit, configured as such, the sensor failure detecting section detects a failure of the breaking force sensor and/or the rotation angle sensor, the switching means interruption failure detecting section detects a failure of the switching means, and the result of detection is then outputted to the outside of the electrically powered brake control unit. Thus, a failure can be detected within a short period of time.

According to the seventh aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a rotation angle sensor detecting a rotation angle of the electrically powered actuator, a braking force sensor detecting the braking force of the brake pad, and switching means for supplying or interrupting electric power supplied to the electrically powered actuator based on a command from outside, the electrically powered brake control unit being actuated by electric power supplied via the switching means and electric power supplied without the intervention of the switching means, wherein the electrically powered brake control unit comprises: a sensor failure detecting section detecting a failure of the braking force sensor and/or the rotation angle sensor in response to an electric power supply OFF command signal of an ignition switch; a switching means interruption failure detecting section performing a failure diagnosis on whether the supply of electric power to the electrically powered actuator can be interrupted by the switching means when the sensor failure detecting section detects that the sensors do not fail; and a failure outputting section outputting a signal for providing to outside the electrically powered brake control unit a notification that the sensor failure detecting section and the switching means interruption failure detecting section are performing processing.

With the electrically powered brake control unit, configured as such, the sensor failure detecting section detects a failure of the braking force sensor and/or the rotation angle sensor in response to an electric power supply OFF command signal of an ignition switch, the switching means interruption failure detecting section performs a failure diagnosis on whether the supply of electric power to the electrically powered actuator can be interrupted by the switching means when the sensor failure detecting section detects that the sensors do not fail, and the failure outputting section notifies the outside that the diagnosis is in execution. Thus, a driver or the like can confirm the completion of the failure detection and can find the presence or absence of the failure.

According to the eighth aspect of the present invention, the electrically powered brake control unit controlling an electrically powered brake system comprises a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, and a rotation angle sensor detecting a rotation angle of the electrically powered actuator, wherein the electrically powered brake control unit comprises: a current sensor detecting a current supplied to the electrically powered actuator; a parking brake actuation determining section detecting actuation of a parking brake by the locking mechanism based on the result of detection by the parking rotation angle sensor; a current sensor failure detecting section detecting a failure of the current sensor when the parking brake actuation determining section detects actuation, of the parking brake; and a current sensor failure outputting section outputting the result of detection by the current sensor failure detecting section to outside the electrically powered brake control unit.

Preferably, the electrically powered brake control unit comprises a current control section controlling a current supplied to the electrically powered actuator, and the current sensor failure detecting section supplies a predetermined current to the electrically powered actuator by the current control section according to the result of determination by the parking brake actuation determining section, and detects a failure of the current sensor based on a change in the current value of the current sensor after the supply of the predetermined current. With the use of the electrically powered brake control unit, configured as such, the parking brake actuation determining section detects actuation of a parking brake by the locking mechanism based on the result of detection by the parking rotation angle sensor, and the current sensor failure detecting section detects a failure of the current sensor. Thus, the results of detection can be outputted to the outside to notify the failure.

The method for controlling an electrically powered brake system according to the present invention controls an electrically powered brake system having a brake pad pressed against by a disc rotor rotating with a wheel, an electrically powered actuator generating a rotating torque, a conversion mechanism generating a braking force of the brake pad based on the rotating torque, a parking brake mechanism having a locking mechanism limiting the rotation of the electrically powered actuator for retaining the braking force without supplying energy from outside, a rotation angle sensor detecting a rotation angle of the electrically powered actuator, a braking force sensor detecting the braking force of the brake pad, and switching means for supplying or interrupting electric power supplied to the electrically powered actuator based on a command from outside, wherein the method comprises the steps of: outputting a command for retaining or releasing the braking force by the parking brake mechanism based on a parking brake actuation command; detecting a failure of the braking force sensor and/or the rotation angle sensor in response to the retaining command by the step of outputting the command; performing a failure diagnosis on whether the supply of electric power to the electrically powered actuator can be interrupted by the switching means when detecting that the sensors do not fail by the step of detecting a failure of the sensors; and outputting the result of detection by the step of detecting a failure of the sensors or the step of diagnosing an interruption failure of the switching means to outside the electrically powered brake control unit.

According to such method for controlling an electrically powered brake system, a command for retaining or releasing the braking force by the parking brake mechanism is outputted based on a parking brake actuation command, a failure of the braking force sensor and/or the rotation angle sensor is detected in response to the retaining command by the step of outputting the command, and a failure diagnosis is performed on whether the supply of electric power to the electrically powered actuator can be interrupted by the switching means. When no sensor failure was detected, the result of detection by the step of detecting a failure of the sensors or the step of diagnosing an interruption failure of the switching means is then outputted to outside the electrically powered brake control unit. Thus, a diagnosis of the braking force sensor, the rotation angle sensor and switching means can be performed within a short period of time. Further, the results of diagnosis can be outputted to the outside of the electrically powered brake control system to notify a driver or the like.

The electrically powered brake system of the present invention and the method for diagnosing a failure of the electrically powered brake system are capable of detecting an abnormality before a vehicle is driven by performing a self-diagnosis of the interior of a system of an electrically powered brake system during actuation of a parking brake, and thus preventing a situation in which the vehicle is driven in a state in which the brake fails. The self-diagnosis is performed by actuating the parking brake when the vehicle is at rest, and therefore disorders and the like of a vehicle behavior resulting from an increase and a decrease in braking force by the self-diagnosis never occur.

DETAILED DESCRIPTION OF THE PREFERRED EMBODIMENTS

Figure 1:
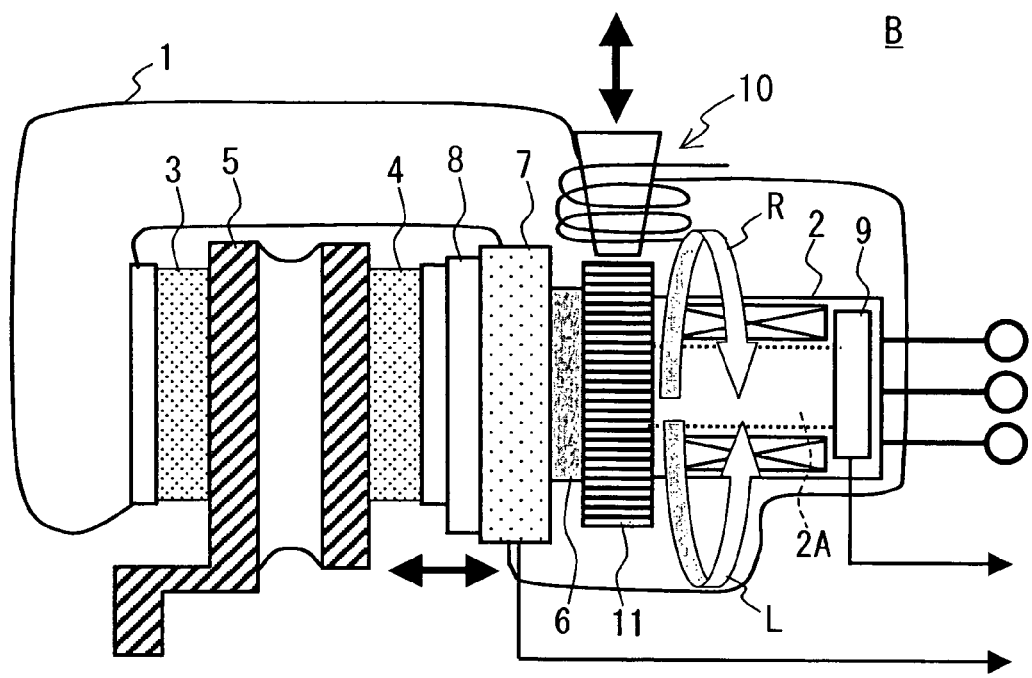
FIG. 1 is a view of the configuration of essential parts of one embodiment of an electrically powered brake apparatus using an electrically powered brake system according to the present invention.
Figure 3:
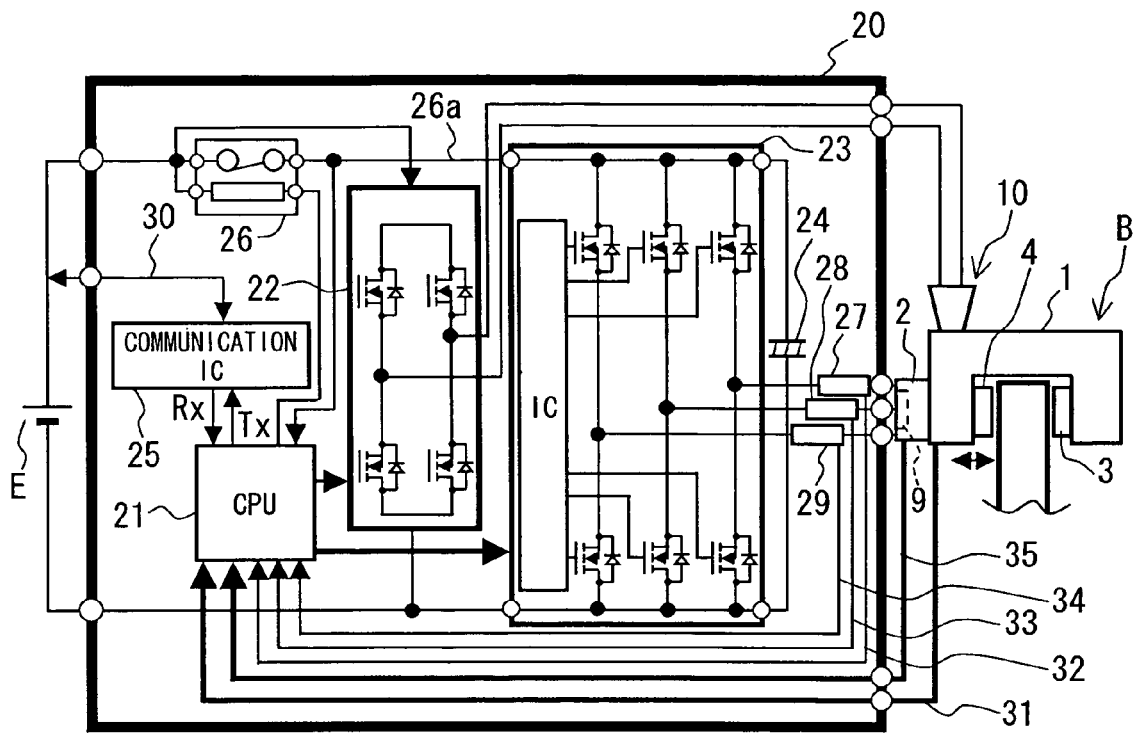
FIG. 3 is a block diagram showing the configuration of a control unit controlling the electrically powered brake systems of FIGS. 1 and 2.
Figure 4:
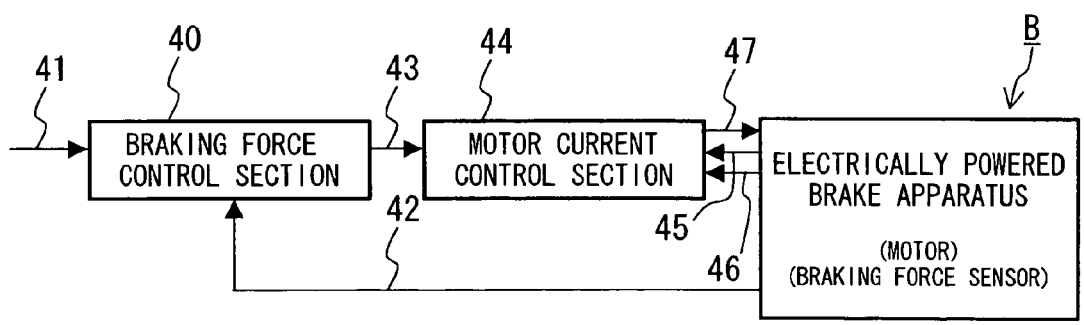
FIG. 4 is a block diagram showing the specifics of control performed in a CPU of the control unit of FIG. 3.
Figure 5:
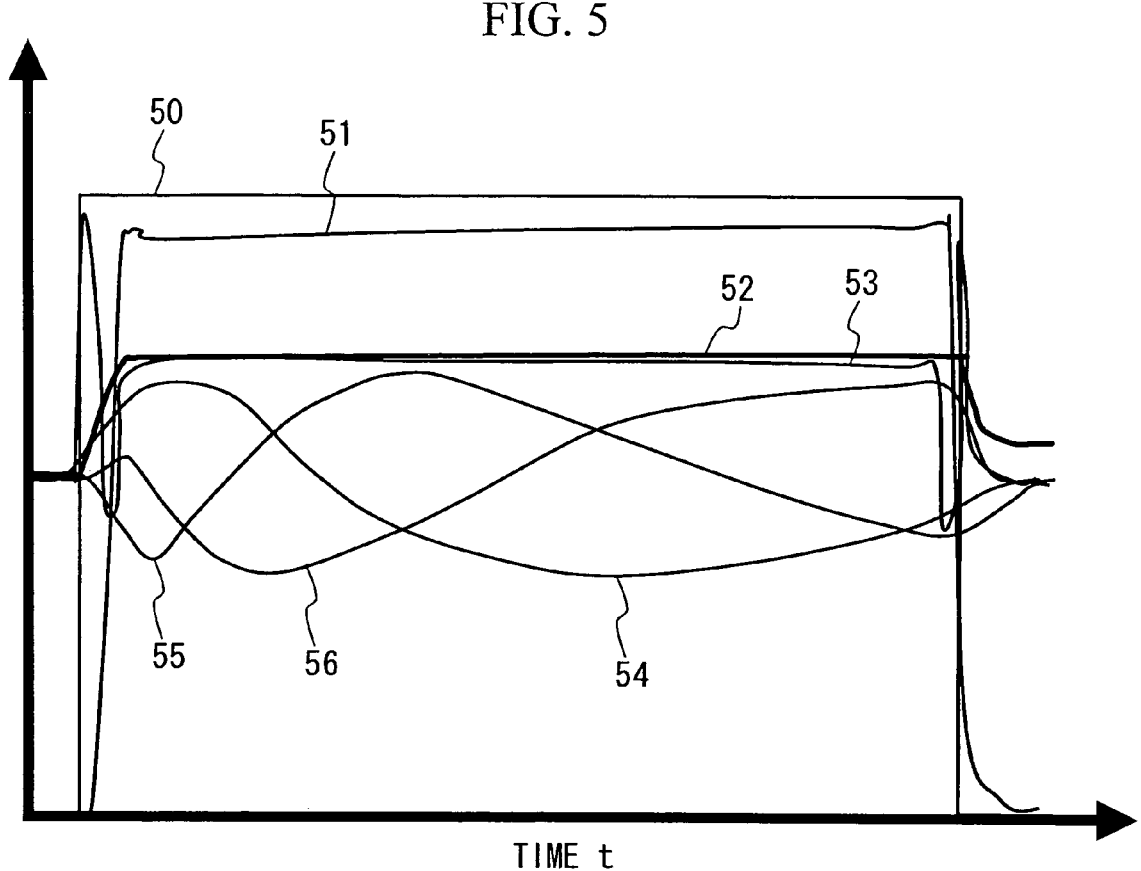
FIG. 5 is a chart showing a change in each data of a control system where a braking force is generated.
Figure 6:
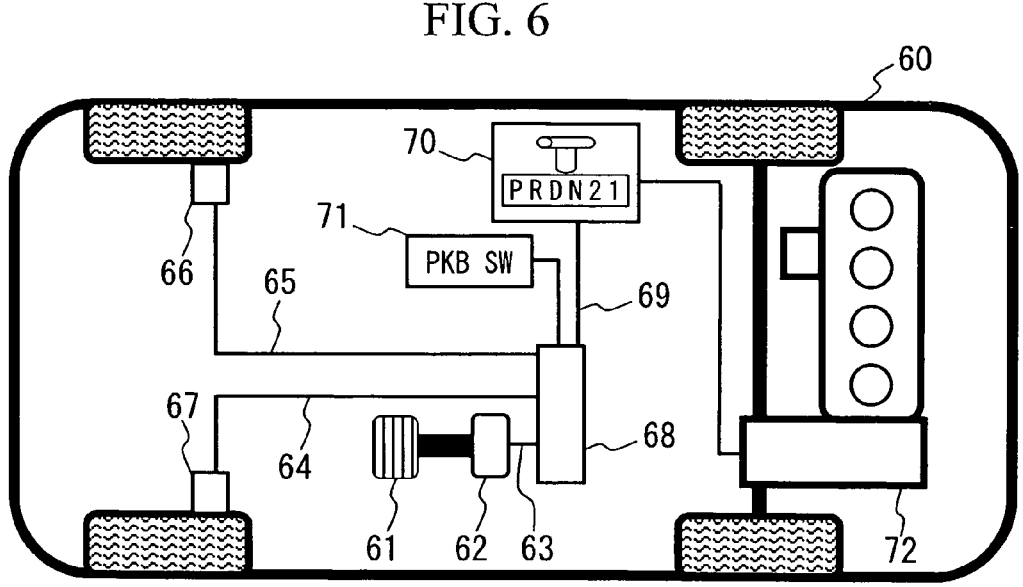
FIG. 6 is a schematic diagram of a vehicle equipped with the electrically powered brake systems of FIGS. 1 and 2.

One embodiment of an electrically powered brake system according to the present invention will be described in detail below based on the drawings. FIG. 1 is a view of the configuration of essential parts of an electrically powered brake apparatus according to this embodiment, FIG. 2 is a view of the configuration of essential parts of a locking mechanism making the electrically powered brake apparatus of FIG. 1 function as a parking brake, FIG. 3 is a block diagram showing the configuration of a control unit controlling the electrically powered brake system, FIG. 4 is a block diagram showing the specifics of control performed in a CPU of FIG. 3, FIG. 5 is a chart showing braking force data, an actual braking force, a motor rotation angle, each phase current of a motor and an effective current of the motor, and FIG. 6 is a schematic diagram of an electrically brake system mounted on a vehicle.

Figure 2:
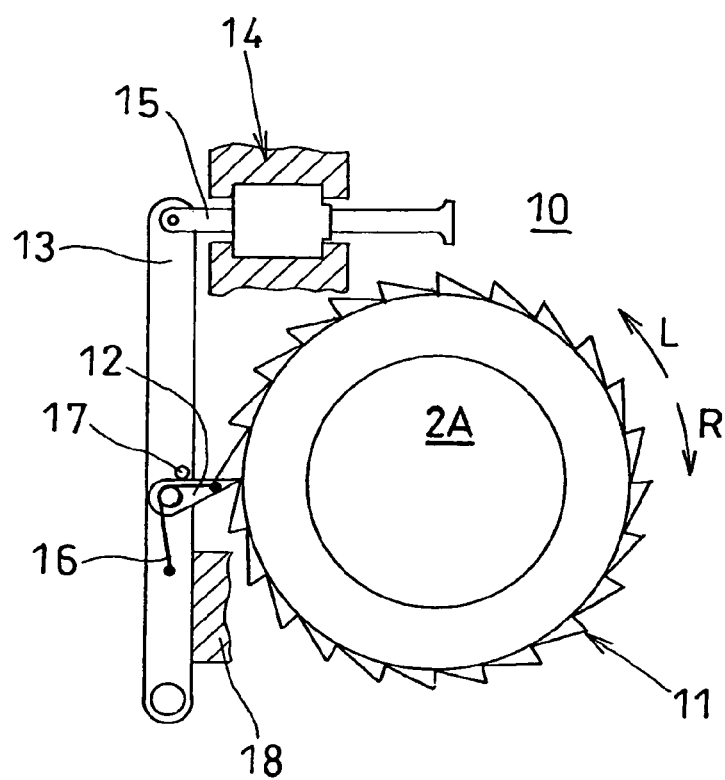
FIG. 2 is a view of the configuration of essential parts of a locking mechanism making the electrically powered brake apparatus of FIG. 1 function as a parking brake.

In FIGS. 1 and 2, the electrically powered brake apparatus B has a caliper 1 floatably supported on a carrier (not shown) fixed to a non-rotary section (knuckle, etc.) of the vehicle, and a motor 2 as a braking force generation source is placed in the caliper 1. Brake pads 3 and 4 are placed with a brake disc rotor 5 therebetween, the brake pad 3 is fixed to the caliper 1, and the brake pad 4 advances and retreats with respect to the disc rotor 5 by rotation of a rotor 2A of the motor 2. In this embodiment, the motor 2 is an alternating current motor, and constitutes an electrically powered actuator generating a rotating torque. Due to this configuration, the disc rotor 5 rotates with a wheel.

The motor 2 has a configuration in which the rotor 2A rotates in a stator, and a piston 7 is brought into a linear motion by a conversion mechanism 6 converting the rotary motion into a linear motion. The caliper 1 is a device converting the rotary motion of the motor 2 into the linear motion of the piston 7 by the conversion mechanism 6, propelling the piston to press the disc rotor 5 with the bake pads 3 and 4, and thereby generating a braking force of a wheel. The braking force is sensed by a braking force sensor 8 and used as a signal for control of a braking force together with a motor rotation angle signal output from a rotation angle detecting sensor 9 detecting the rotation of the motor 2. The motor 2, for which a three-phase brushless motor theoretically and structurally advantageous in terms of controllability and a lifetime is generally used, can rotate in a normal rotation direction R and an opposite rotation direction L. For the conversion mechanism 6, an appropriate mechanism such as a ball screw mechanism or a ball ramp mechanism described in Patent Document 1 and others may be used.

The electrically powered brake apparatus B has a locking mechanism 10 as braking force retaining means comprised of a solenoid, a plunger and the like mechanically retaining a braking force without adding electrical energy during parking or the like, in addition to normal braking operations such as a braking operation performed by a driver and braking operations by an ABS (antilock brake system) and an antiskid brake system. The locking mechanism 10 is a mechanism making the electrically powered brake apparatus B function as a parking brake.

One example of the locking mechanism 10 will now be described with reference to FIG. 2. The locking mechanism 10 has a ratchet wheel 11 fixed to the rotor 2A and a rocking arm 13 having a coupling claw 12 engaging with the ratchet wheel, and is configured to couple a rod 15 supported on a plunger slid by a solenoid 14 to the rocking arm 13. The ratchet wheel 11 has a tooth form in which a vertical tooth plane is formed on the front side in the rotation direction L of the rotor when the brake is released, and an inclined plane is formed on the front side in the rotation direction R of the rotor when the brake is applied. In FIG. 2, the coupling claw 12 energized counterclockwise and has a rocking range regulated by a pin 17. The rocking arm 13 has a rocking range regulated by a stopper 18.

The locking mechanism 10 is a mechanism retaining a braking force in a state in which the motor 2 rotates and the brake pads 3 and 4 hold the disc rotor 5 therebetween to generate the braking force, and when the solenoid 14 is driven to press the coupling claw 12 supported on the rocking arm 13 against the ratchet wheel 11 fixed to the rotor 2A of the motor 2, the rotation angle of the ratchet wheel 11 is retained, and the generated braking force is retained even if the current of the motor 2 is interrupted. Namely, owing to the locking mechanism 10, a parking brake mechanism can retain a braking force without supply of energy from outside. By releasing the solenoid 14 to detach the coupling claw 12 from the ratchet wheel 11 in a state in which a braking force is retained, the retained braking force is released, and the parking brake mechanism is released.

FIG. 3 is a view of the configuration of a control unit for controlling the electronically powered brake apparatus B. A control unit 20 is comprised of a CPU 21, a solenoid driver 22, an inverter 23, a ripple absorbing capacitor 24, a communication IC 25, fail safe relay (F/S relay) 26, current sensors 27, 28 and 29 as current detecting means, and the like. The current sensors are placed on wiring between the inverter 23 driving the motor and the motor 2. The motor 2 is supplied with a voltage from an electric power supply E via the fail safe relay 26.

A braking signal of a brake is received at the communication IC 25 through a communication bus 30 from the vehicle side, and input to the CPU 21. The CPU 21 senses a braking force at the time of receiving the braking signal by a braking force sensor signal 31 with respect to the input braking sensor, and controls the braking force to follow the received braking signal. Motor current and rotation angle signals are input to the CPU 21 as signals 32, 33 and 34 from the current sensors 27, 28 and 29 and a signal from the rotation angle detecting sensor 9. The CPU 21 also functions as a diagnosis means performing a diagnosis of elements constituting the electrically powered brake apparatus B.

FIG. 4 shows the specifics of control performed in the CPU in the control unit 20. In FIG. 4, command braking force data 41 and actual braking force data 42 are input to a braking force control section 40. For the actual braking force data 42, an output of the braking force sensor 8 is used. The braking force control section 40 compares the braking force data 41 with the actual braking force data 42, performs computation, and outputs current command data 43 necessary for an actual braking force to follow a command braking force to a motor current control section 44. The motor current control section 44 has motor rotation angle data 45 and motor actual current data 46 input thereto from the electrically powered brake apparatus B, compares these data with the current command data 43, performs computation, and outputs data for the current command data to follow the motor actual current data 46, i.e. command current data 47.

FIG. 5 shows how each data of a control system changes if a stepwise braking force is generated, based on experimental results. In FIG. 5, the abscissa represents time t and the ordinate represents a current value, a rotation angle and a braking force on a relative basis. In FIG. 5, for input braking force data 50, the motor rotates according to a motor rotation angle 52, phase currents 54, 55 and 56 pass through phases of the motor, an effective current 53 of the motor passes, and an actual braking force 51 is output. For the stepwise input braking force data 50, the motor starts rotating and then stops to retain and release the braking force. In this way, for input braking force data, a braking force is controlled in the electrically powered brake apparatus B.

FIG. 6 shows an example in which the electrically powered brake apparatus B having the configuration described above is mounted on a vehicle. Since a parking brake is generally applied to two rear wheels, an example in which the electrically powered brake system is mounted on two rear wheels is shown in this example. Two front wheels can be combined with any of hydraulic brake and electrically powered brake systems. The electrically brake apparatus B of this embodiment may be mounted on four wheels as a matter of course.

In FIG. 6, a vehicle 60 has a brake pedal 61, and for a brake operation by a driver, the amount of operation of the brake pedal 61 is detected by brake operation detecting means 62, converted into an electrical signal and input to braking force controlling means 68 through a communication line 63. In the braking force controlling means 68, control of a braking force by the brake operation by the driver is calculated to obtain an optimum allocation of braking for each wheel, and brake operation signals are delivered to electrically powered brake apparatuses 66 and. 67 of rear wheels through communication lines 64 and 65. When the brake operation signals are input to the electrically powered brake apparatuses 66 and 67, the rotor 2A of the motor 2 rotates in the direction R in FIG. 1 as described above. The piston 7 is propelled by the conversion mechanism 6 with rotation of the motor 2, and the disc rotor 5 is held between the brake pads 3 and 4, whereby a braking force related to the rotation of the motor 2 is generated.

Data communications between a shift control unit 70 and a transmission 72 are carried out via a communication line 73. The parking brake is actuated when the speed of the vehicle is "0" in data from the transmission 72, when the position of a shift lever of the shift control unit 70 is "P", or when the driver operates a parking brake switch (PKB SW) 71.

How to control the electrically powered brake apparatus B as a parking brake using the locking mechanism 10 as braking force retaining means will now be described using FIGS. 1, 2 and 3.

A parking brake actuation request is received via the communication bus 30, and a parking brake operation is started. When the parking brake request is received, the rotor 2A of the motor 2 is caused to rotate in the direction R by a parking brake braking force signal, the piston 7 is propelled, and the brake pads 3 and 4 press the disc rotor 5 to generate a braking force. A command of a current to the motor 2 is controlled to be "0" in the state in which the braking force is generated. In this case, a rotating torque is generated in the direction L opposite to the direction R leading to an increase in braking force in the motor under an influence of the rigidity of the caliper or the like, and the rotating torque causes an upward force to act on the rod 15 associated with the solenoid 14 of the locking mechanism 10 retaining the braking force, but the tooth form of the ratchet wheel 11 abutting against the coupling claw 12 maintains this state, the rotation of the motor in the direction L (method for releasing a braking force) is regulated, and a braking force is retained to function as a parking brake.

If the parking brake is released, the solenoid 14 of the locking mechanism 10 is released and a current is made to pass through the motor by a parking brake release signal, and the motor 2 rotates in the direction L. The piston 7 retreats in response to the rotation, a pressing force to the disc rotor 5 is released, and braking as a parking brake is released. The solenoid 14 has a permanent magnet therein, and is preferably a self-holding type with the magnet held on one end side or the other end side.

In the event that a fault occurs in the control unit 20 or the electrically powered brake apparatus B, and it is determined on the control unit 20 side that control of a braking force is abnormal, the rotation of the motor is brought back via the conversion mechanism 6 by a counterforce received by the brake pads 3 and 4 from the disc rotor 5 to remove the braking force at the time when the braking force is generated if the fail safe relay 26 in the control unit in FIG. 3 is cut off to cancel the passage of a current through the motor 2. Such mechanisms are described in detail in JP Patent Publication (Kokai) No. 2004-116712 and others.

During actuation of the parking brake, passage of a current through the electrically powered brake apparatus B and control thereof are not necessary, and a braking force necessary and sufficient for keeping a vehicle at rest is normally generated even in a road environment such as a steep slope. The time when the parking brake is released is equivalent to the time when the vehicle makes a start, and therefore a situation in which a braking force is generated simultaneously in this state must not occur because it leads to drag of the brake.

Namely, in the electrically powered brake apparatus B including a mechanism automatically applying a parking brake as in this embodiment, the situation frequently occurs in normally driving the vehicle during actuation of the parking brake, and even if in this situation, a diagnosis operation of the control unit 20 is performed, a phenomenon impairing the safe driving of the vehicle never occurs. In this situation, various self diagnoses can be performed for ensuring the reliability of the electrically powered brake apparatus B.

Components (elements) necessary in the electrically powered brake apparatus B and the control unit 20 for performing control of a braking force are as described above, but for determining the quality of each component, the component must actually be operated to determine whether or not it is in a specified output state. However, in the electrically powered brake apparatus B, for operating each component and performing a diagnosis thereof, a braking force is fluctuated and output in timing of the diagnosis.

Namely, if a self-diagnosis is performed while the vehicle is driven, there may be cases where a basic function as a proper brake cannot be satisfied, e.g. a brake is applied despite the fact that the driver does not perform a brake operation, or a desired brake does not take hold despite the fact that a brake is applied. On the contrary, if a self-diagnosis is performed only in a situation in which a brake is no longer used subsequently, for example, after shutdown of an electric power supply of the system, detection of a failure is delayed although the failure has occurred before a brake operation is actually performed, and as a result, a basic function of a brake cannot be satisfied as in the case described above.

Specific failure diagnosis locations include locations for which it is difficult to determine the quality by a failure diagnosis unless the electrically powered brake apparatus B is actually actuated, such as the fail safe relay 26, the braking force sensor 8, the rotation angle detecting sensor 9 and the current sensors 27 to 29. A specific method for performing a failure diagnosis of elements such as the relay and the sensors described above will be described below.

(Diagnosis of Fail Safe Relay)

A method for performing a diagnosis of the fail safe relay 26 will be described using FIGS. 3 and 7A. The fail safe relay 26 is installed for cutting off an electric power supply line of the motor 2 for actuating a fail open mechanism of the electrically powered brake system in the event that a failure disabling control of a braking force occurs in the electrically powered brake apparatus B. If the fail safe relay 26 cannot be cut off when a failure occurs, a control-abnormal braking force can be generated, and the driving stability of the vehicle may be impaired.

Failure modes of the fail safe relay 26 are broadly grouped under modes in which a contact point is fixed on the on-side (on-fixation) and modes in which the contact point is fixed on the off-side (off-fixation). Generally, an on-fixation and off-fixation diagnosis of the relay is performed by turning a relay coil on and off with a voltage applied to one of the relay contact points, monitoring a voltage on the other contact point side simultaneously, and determining whether or not an applied voltage can be monitored.

However, when the relay is used for cutting off the electric power supply to the motor as in the electrically powered brake system, a voltage is observed on a contact point line 26a on the motor side due to residual electric charges of the current variation inhibiting capacitor 24 provided on the electric power supply line for the motor (see FIG. 3), so that a normal diagnosis of the relay cannot be performed, even though the relay is cut off. For this reason, control to make a current pass through the motor is performed for discharging electric charges on the capacitor provided between the electric power supply on the motor side and the ground with the fail safe relay turned off when an on-fixation diagnosis of the fail safe relay 26 is performed.

However, if the fail safe relay 26 is on-fixed, or if the electric capacity of the capacitor is so large that the capacitor is charged with electric charges sufficient for rotating the motor, the motor rotates each time an on-fixation diagnosis of the fail safe relay 26 is performed in the electrically powered brake system, and the braking force varies before and after the diagnosis. Namely, in a state in which a certain brake operation signal is input at the time of the on-fixation diagnosis of the fail safe relay, if control is performed to rotate the motor in a direction leading to an increase in braking force for the brake operation signal, the braking force further increases for the brake operation signal, and if control is performed to rotate the motor in a direction leading in a decrease in braking force, the braking force further decreases for the brake operation signal. In addition, if control is performed to rotate the motor in a direction leading to an increase in braking force when a diagnosis of the fail safe relay is performed while no brake is applied, e.g. the vehicle is driven, a braking force may be generated on only a wheel for which the diagnosis is performed, thus causing disturbance of the driving stability of the vehicle.

It is also assumed that when a steep and strong braking force is required during the diagnosis, a desired brake cannot be obtained unless contact points of the fail safe relay 26 are connected. Thus, the fail safe relay 26 is very important in terms of safety in the electrically powered brake system, but timing for performing a failure diagnosis of the relay is very difficult.

In the present invention, the diagnosis of the fail safe relay 26 is performed during actuation of the parking brake. As shown in FIG. 6, an operation interface of the parking brake added to the electrically powered brake system is not a large-scale mechanical interface such as a parking brake lever conventionally provided in the vehicle, but is a simple interface such as a parking brake switch (PKB SW) 71.

The electrically powered parking brake currently coming into widespread use has an automatic parking brake function in which a parking brake is automatically applied not only when a parking lever is pulled but also when the vehicle comes to rest and the shift position is shifted to a P (parking) range, or the like, and the parking brake is released at the instant when the vehicle makes a start, and it can easily be conceived that this function will also be incorporated in the parking brake function of the electrically powered brake system. Namely, it is conceivable that a situation in which the vehicle comes to rest and the automatic parking function operates frequently occurs when the vehicle is actually driven, and this state is used to perform a self-diagnosis of the fail safe relay, thus making it possible to eliminate a problem associated with a change in the braking force.

Processing performed in the electrically powered brake system is shown in FIG. 7A. When the vehicle makes a transition from a driving state to a rest state, fail safe relay diagnosis processing 80 is performed. Whether or not a parking brake is being actuated is determined in processing 81. If the parking brake is being actuated, the braking force generated by the parking brake is a braking force capable of keeping the vehicle at rest in every conceivable road environment.

When a braking force is generated by the parking brake, and reaches a braking force within a specified level, the braking force is mechanically retained by the locking mechanism 10. Even if in this state, passage of a current through the motor 2 is interrupted, the braking force never decreases. Namely, the braking force is retained even if the fail safe relay 26 is turned off in processing 86 in a state in which the parking brake is retained. However, there is some degree of control range in the braking force due to the rigidity of the brake pad, heat contraction, variations in the coefficient of friction between the pad and disc rotor, and the like.

In this state, a current command value (q axis current) is given from the CPU 21 to the inverter 23 to rotate the motor in a direction leading to an increase in braking force in processing 82. The current command value should be determined based on a time period over which the capacitor 24 of FIG. 3 charged with electric charges is discharged. After the current command value is given, a terminal voltage V_FSFRLY of the fail safe relay 26 is monitored in processing 83, and if the terminal voltage is equal to or smaller than the predetermined value $V_{S1}$, the on-fixation diagnosis of the fail safe relay is determined to be OK in processing 84. Conversely, the terminal voltage V_FSFRLY of the fail safe relay is monitored, and if the terminal voltage is greater than $V_{S1}$, the on-fixation diagnosis of the fail safe relay is determined to be NG in processing 85. The predetermined value $V_{S1}$ is determined by taking the detection error of the voltage detection circuit and/or noise superposing to the GND level or the like into consideration. Such value is generally about 1 V(volt).

Importantly, even if the fail safe relay is on-fixed when a diagnosis of the fail safe relay 26 is performed, the driving stability, the reliability of the vehicle and the lifetime are not adversely affected because the motor 2 rotates in a direction leading to an increase in braking force within a range of a braking force generated by the parking brake, and therefore for the vehicle, the barking force of the parking brake already actuated increase only slightly within a specified range. In this case, a warning is preferably given by a warning lamp, a buzzer or the like.

If the vehicle makes a start during the diagnosis, on-fixation diagnosis end interruption processing for the fail safe relay in processing 87 shown in FIG. 7B is performed, the locking mechanism 10 as braking force retaining means is released in processing 88, and the fail safe relay 26 is turned on in processing 89. When the relay is turned on, the motor 2 in FIG. 1 rotates in the direction L so as to release the braking force, and is controlled to rotate in a direction leading to removal of the braking force. Even in the event that a response to control of the braking force by the motor is delayed, the reliability with which the vehicle is driven is not impaired in this case because when the vehicle makes a start, the solenoid 14 operates so as to mechanically release the parking brake, and therefore the braking force is removed without controlling the motor 2 to rotate in a direction leading to removal of the braking force with an action of the aforementioned fail open.

A diagnosis of the fail safe relay 26 can also be performed by the following method.

Figure 8:
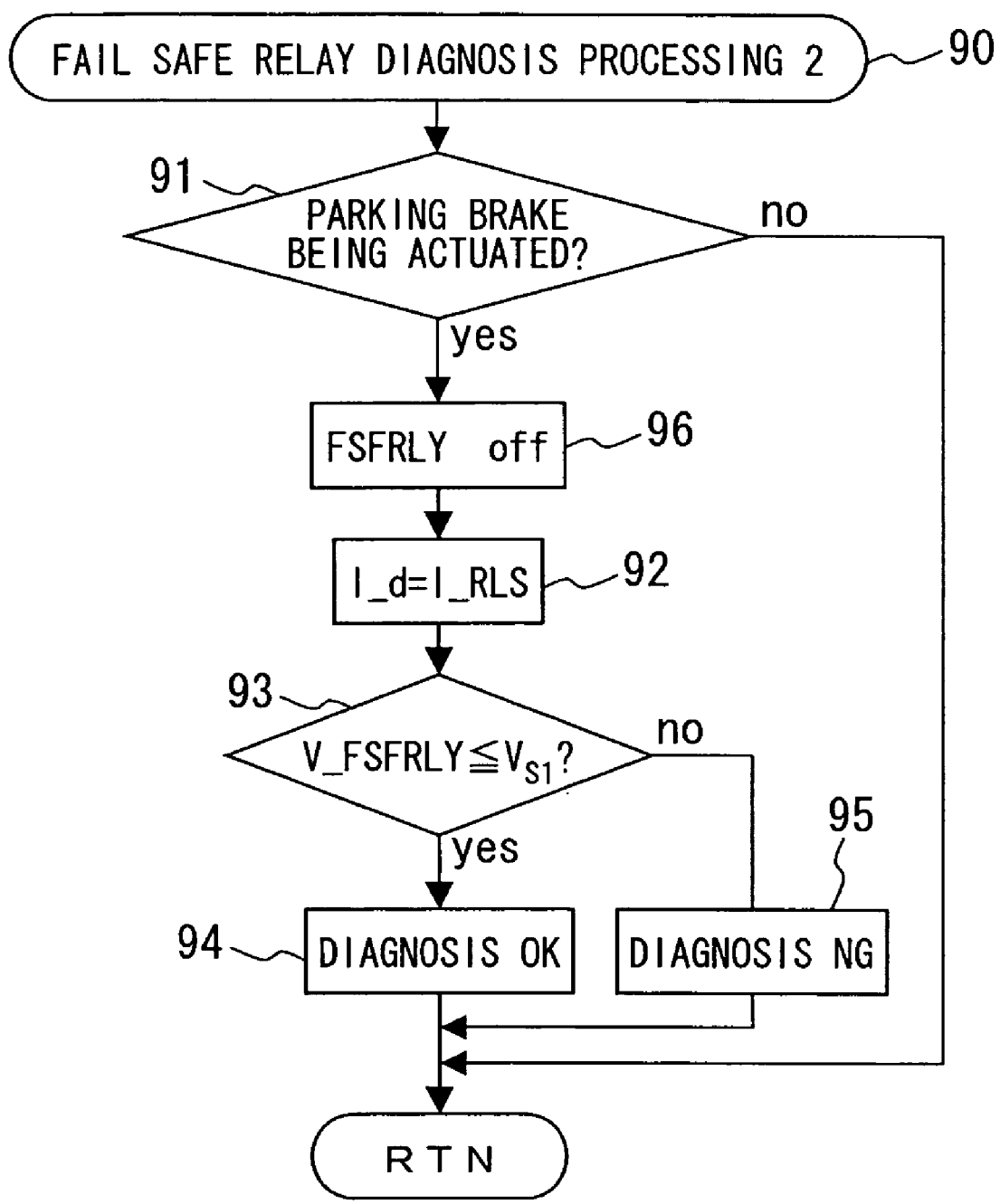
FIG. 8 is a flowchart showing another diagnosis processing operation for the fail safe relay.

Processing performed in the electrically powered brake system is shown in FIG. 8. When the vehicle makes a transition from a driving state to a rest state, fail safe relay diagnosis processing 90 is performed. Whether or not a parking brake is being actuated is determined in processing 91. If the parking brake is being actuated, the braking force generated by the parking brake is a braking force capable of keeping the vehicle at rest in every conceivable road environment.

When a braking force is generated by the parking brake, and reaches a braking force within a specified level, the braking force is mechanically retained by the locking mechanism 10 of the electrically powered brake apparatus B. Even if in this state, passage of a current through the motor 2 is interrupted, the braking force never decreases. Namely, the braking force is retained even if the fail safe relay 26 is turned off in processing 96 in a state in which the parking brake is retained. However, there is some degree of control range in the braking force due to the rigidity of the brake pad, heat contraction, variations in the coefficient of friction between the pad and disc rotor, and the like.

In this state, a regenerated current command value (d axis current) is given to the motor 2. The current command value should be determined based on a time period over which the capacitor 24 of FIG. 3 charged with electric charges is discharged. After the current command value is given, a terminal voltage V_FSFRLY of the fail safe relay 26 is monitored in processing 93, and if the terminal voltage is equal to or smaller than the predetermined value $V_{S1}$, the on-fixation diagnosis of the fail safe relay is determined to be OK in processing 94. Conversely, the terminal voltage V_FSFRLY of the fail safe relay is monitored, and if the terminal voltage is greater than $V_{S1}$, the on-fixation diagnosis of the fail safe relay is determined to be NG in processing 95.

In this case, even if the d axis current command value is given to the motor, a rotary force causing the electrically powered brake apparatus B to operate is not generated, and therefore no braking force is generated and the driving stability, the reliability of the vehicle and the lifetime are not adversely affected.

If the vehicle makes a start during the diagnosis, on-fixation diagnosis end interruption processing for the fail safe relay in processing 87 shown in FIG. 7B is performed, the braking force retaining means is released in processing 88, and the fail safe relay 26 is turned on in processing 89. When the relay is turned on, the rotor 2A of the motor 2 in FIG. 1 rotates in the direction L so as to release the braking force, and is controlled to rotate in a direction leading to removal of the braking force. Even in the event that a response to control of the braking force by the motor is delayed, the reliability with which the vehicle is driven is not impaired in this case because when the vehicle makes a start, the solenoid 14 operates so as to mechanically release the parking brake, and therefore the braking force is removed without controlling the motor to rotate in a direction leading to removal of the braking force with an action of the aforementioned fail open.

(Diagnosis of Braking Force Sensor and Rotation Angle Detecting Sensor)

The braking force sensor 8 is a sensor detecting a level of force with which the brake pads 3 and 4 press the disc rotor 5 in the electrically powered brake apparatus B, and the sensor is very important in performing control of a braking force. For the braking force sensor 8, those used in piezoelectric elements and strain gauges are generally well known. The rotation angle detecting sensor 9 for the motor 2 is a sensor which is used for performing current control of the motor and for calculating the rotation direction and the rotation speed, and a resolver, a hole IC and the like are well known.

As a braking force sensor failure mode, a disconnection failure of a sensing element, a short failure and a mean value sticking failure are common, and for the disconnection failure and the short failure, a smart sensor having a self-diagnosis function incorporated in the sensor main body is coming into widespread uses because an element output end voltage has an output value capable of easily discriminating an abnormality theoretically. However, in the mean value sticking failure of the braking force sensor, a diagnosis algorithm compatible with any system does not exist, but there is only diagnosis means for artificially generating a test waveform, for example, at power-on of the sensor and performing a self-diagnosis on whether or not the state can be sensed.

In addition, it is difficult to apply this type of sensor to a system for which what timing in which how much braking force is generated by a required operation is unknown like the electrically powered brake system. Namely, the sensing of the braking force is impossible after the power-on of the sensor until completion of the self-diagnosis, and during this time period, control of a braking force as the electrically powered brake system cannot be performed. However, in the present invention, a mean value sticking failure can be detected even when the aforementioned braking force sensor having no self-diagnosis function is used. In addition, in the rotation angle detecting sensor 9, an absolute angle can be recognized only by the sensor, and the angle must be estimated using other sensor signals. The present invention is also very effective in this respect.

A specific diagnosis method will be described using FIGS. 9 and 10. As in the diagnosis of the fail safe relay 26, the vehicle makes a transition from a driving state to a rest state, and a parking brake is actuated. The braking force generated by the parking brake is a braking force capable of keeping the vehicle at rest in every conceivable road environment, but as shown in FIG. 10, there is some degree of control range such as a range from F1 to F2 in the braking force due to the rigidity of the brake pad, heat contraction, variations in the coefficient of friction between the pad and disc rotor, and the like.

Figure 9:
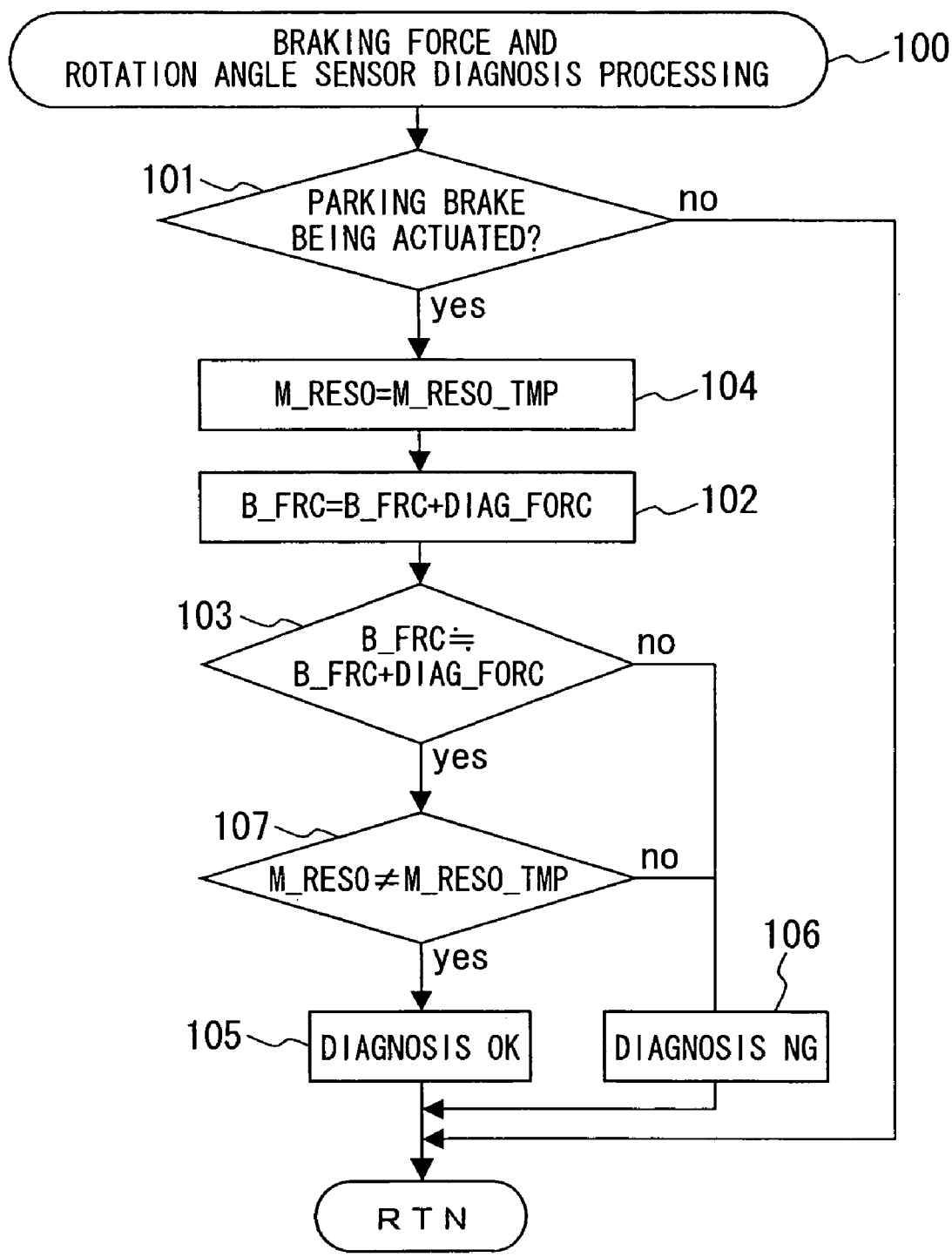
FIG. 9 is a flowchart showing a diagnosis processing operation for a braking force sensor and a rotation angle detecting sensor.
Figure 10:
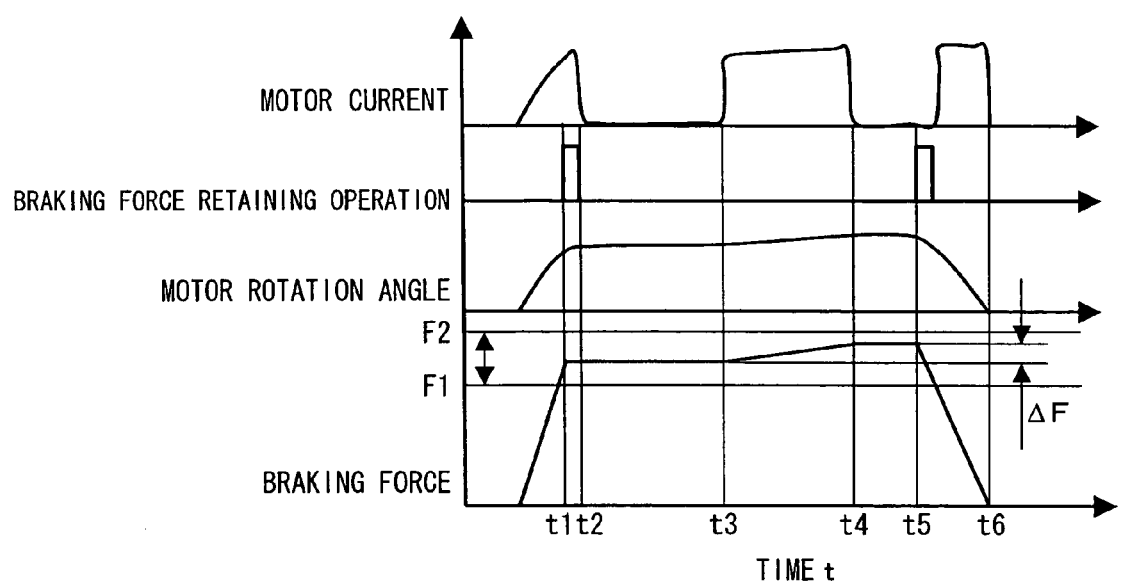
FIG. 10 is a chart of the diagnosis processing operation of FIG. 9.

When the braking force by the parking brake is generated at time point t1 in FIG. 10, and reaches a braking force within a specified level, the braking force is mechanically retained by the locking mechanism 10 as a braking force retaining mechanism of the electrically powered brake apparatus B at time point t2. At this time point, braking force sensor diagnosis processing in FIG. 9 is started. At this time point t2, the braking force is mechanically retained, and therefore the current of the motor is "0". In processing 104, M_RESO_TMP that is a rotation angle data value of the motor at this time is stored in a buffer M_RESO.

Processing shifts from processing 104 in FIG. 9 to processing 102 for diagnosing mean value sticking of the braking sensor, and during actuation of the parking brake, the braking force is increased by ΔF (DIAG_FORC as a data value in processing 102) within a range not exceeding a maximum retained braking force F2 at time point t3. In this state, a control signal is output to rotate the motor 2 in a direction leading to an increase in braking force. If the braking force sensor 8 is normal, it is detected that the braking force increases at time point t4 by DIAG_FORC as a data value in processing 103 (ΔF as an actual braking force) compared to the braking force at t3.

Since the rotation angle of the motor also changes from the angle at time point t2, this change is detected in processing 107, and the diagnosis is determined to be OK in processing 105. If a sticking failure has occurred, the diagnosis is determined to be NG in processing 106. In this case, a fail safe action of, for example, quickly releasing the locking mechanism 10 by the solenoid 14 to release the retained braking force, turning the fail safe relay 26 off to create a fail open state, and lighting a warning lamp can be made before the vehicle is driven.

If a transition is made to a mode in which the vehicle makes a start during the diagnosis, the diagnoses of the braking force sensor 8 and the rotation angle detecting sensor 9 are stopped. If the diagnosis is normally completed, the braking force is retained at time point t4, and when the retained braking force is released again at time point t5, the motor is inversely rotated in the direction L, and at time point t6, the braking force is completely released to create a state in which normal driving is possible.

(Diagnosis of Current Sensor)

The current sensors 27, 28 and 29 are placed on wiring between the inverter 23 and the motor 2 in FIG. 3, detect a phase current passing through the motor 2 of the electrically powered brake apparatus B, and are very important for current feedback control of the motor. For the current sensor, clamp type sensors using a hall element and sensors based on a method in which a shunt resistor is inserted and a passing current is sensed by terminal voltages generated at opposite ends of the resistor are well known. The current value which is used for control of the motor 2 is a value obtained by converting the aforementioned current into an effective current.

As shown in FIG. 4, when a requested braking force by command braking force data 41 by a brake operation signal is input, the braking force control section 40 feeds back actual braking force data 42 being generated at this time, and calculates a current necessary for bringing the actual braking force close to the requested braking force and required to pass through the motor. According to a current command signal 43 output from the braking force control section 40, the motor current control section 44 makes a current pass through the motor, and increases or decreases the current passing through the motor so that the actual braking force reaches the requested braking force. Such control generally consists of PI control. Therefore, it is conceivable that even if an abnormality occurs in the current sensor, control of a braking force is established by a PI component of feedback control, and a failure of the current sensor is potentialized. Failures of the current sensor include output offset abnormalities (abnormality of the output signal level when the detected current is 0 A) and gain abnormalities.

According to the present invention, the potential failure of the current sensor described above can be extracted. A method for performing a diagnosis of the current sensor will be described using FIGS. 11 and 12.

Figure 11:
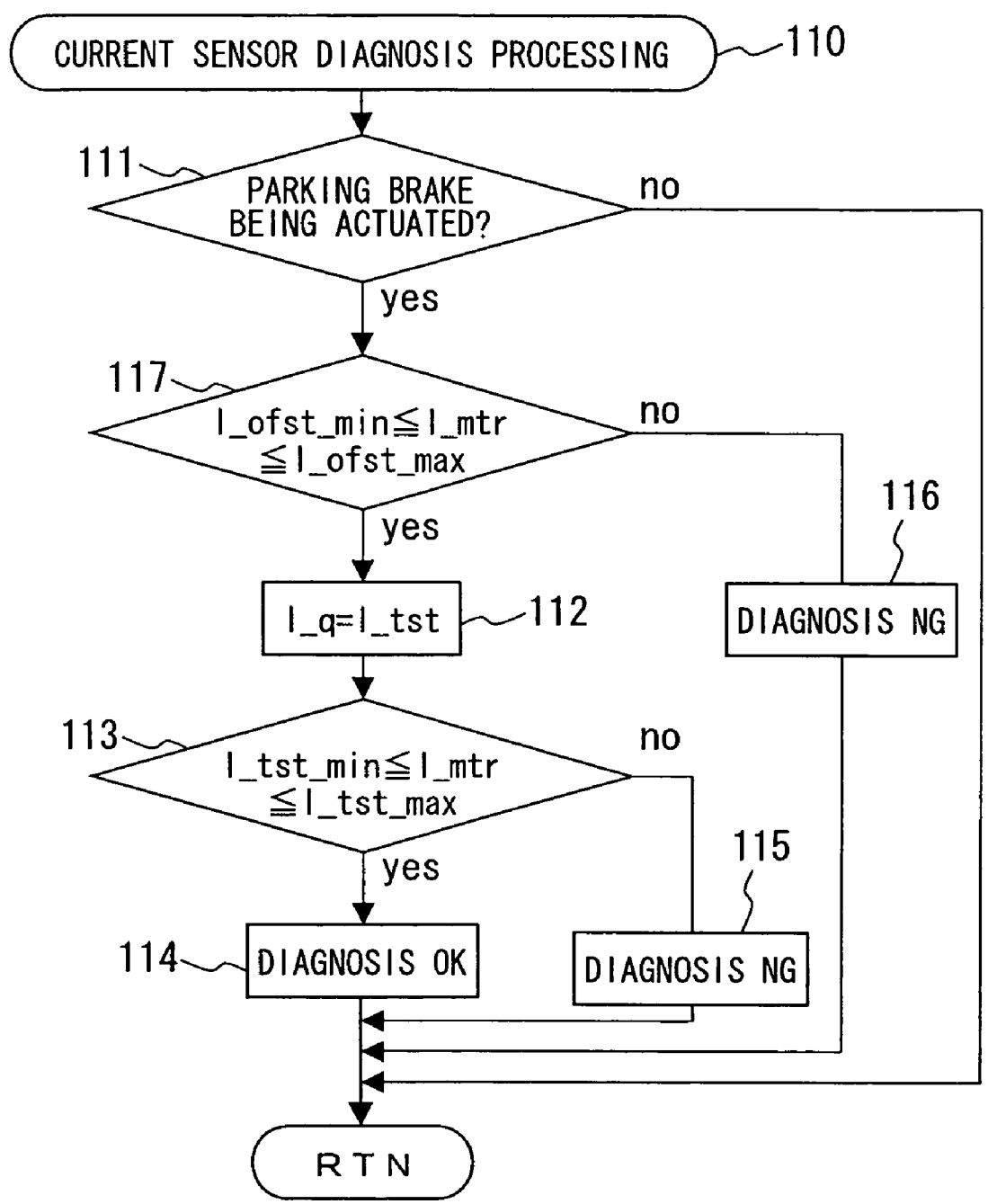
FIG. 11 is a flowchart showing diagnosis processing for a current sensor.
Figure 12:
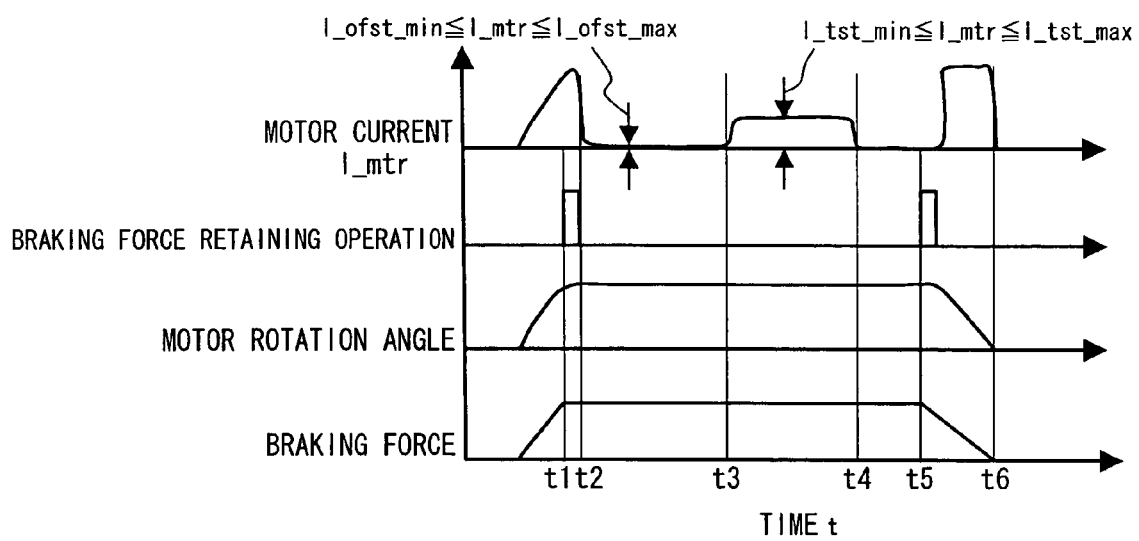
FIG. 12 is a chart of the diagnosis processing operation of FIG. 11.

When the braking force by the parking brake is generated at time point t1 in FIG. 12, and reaches a braking force within a specified level, the braking force is mechanically retained by the locking mechanism 10 of the electrically powered brake apparatus B at time point t2. At this time point, braking force sensor diagnosis processing 110 in FIG. 11 is started. When the start of actuation of the parking brake is ensured for performing a diagnosis of the current sensor from processing 110 of FIG. 11, processing shifts to processing 117, where a motor current I_mtr calculated from each phase of the motor is monitored.

At time point t2, the current of the motor is theoretically "0" because the braking force is mechanically retained. If the I_mtr is deviated from a specified value, I_ofst_min≦I_mtr ≦I_ofst_max, it is determined that a monitored value at "0" in the current sensor is abnormal, and processing shifts to processing 116, where it is determined that a current sensor offset is abnormal. If the offset is normal, processing shifts to processing 112, where a test current I_tst is given to the motor within a range not exceeding the braking force retained at time point t3 during actuation of the parking brake.

In this state, a control signal is output to rotate the motor in a direction leading to an increase in braking force. If the current sensor is normal, the motor current I_mtr should be in the range from a threshold I_tst_min to I_tst_max as a data value in processing 113 for the current request command value at t3. If the motor current is in this range, the diagnosis is determined to be OK in processing 114. If the motor current is deviated from the threshold, the diagnosis is determined to be NG in processing 115. In this case, a fail safe action of, for example, quickly releasing the retained braking force by the solenoid 14, turning the fail safe relay 26 off to create a fail open state and lighting a warning lamp can be made before the vehicle is driven.

If a transition is made to a mode in which the vehicle makes a start during the diagnosis, the diagnosis of the current sensor is stopped. If the diagnosis is normally completed, the braking force is retained at time point t4, and when the retained braking force is released again at time point t5, the motor is inversely rotated in the direction L, and at time point t6, the braking force is completely released to create a state in which normal driving is possible.

As described above, by giving a specified brake command and current command to a control system during actuation of the parking brake, diagnoses of sensors and circuits in the control unit 20 of the electrically powered brake system can be performed before the driving of the vehicle is started, and diagnoses of elements of the electrically powered brake system can be performed without disturbing the behavior of the vehicle.

Figure 13:
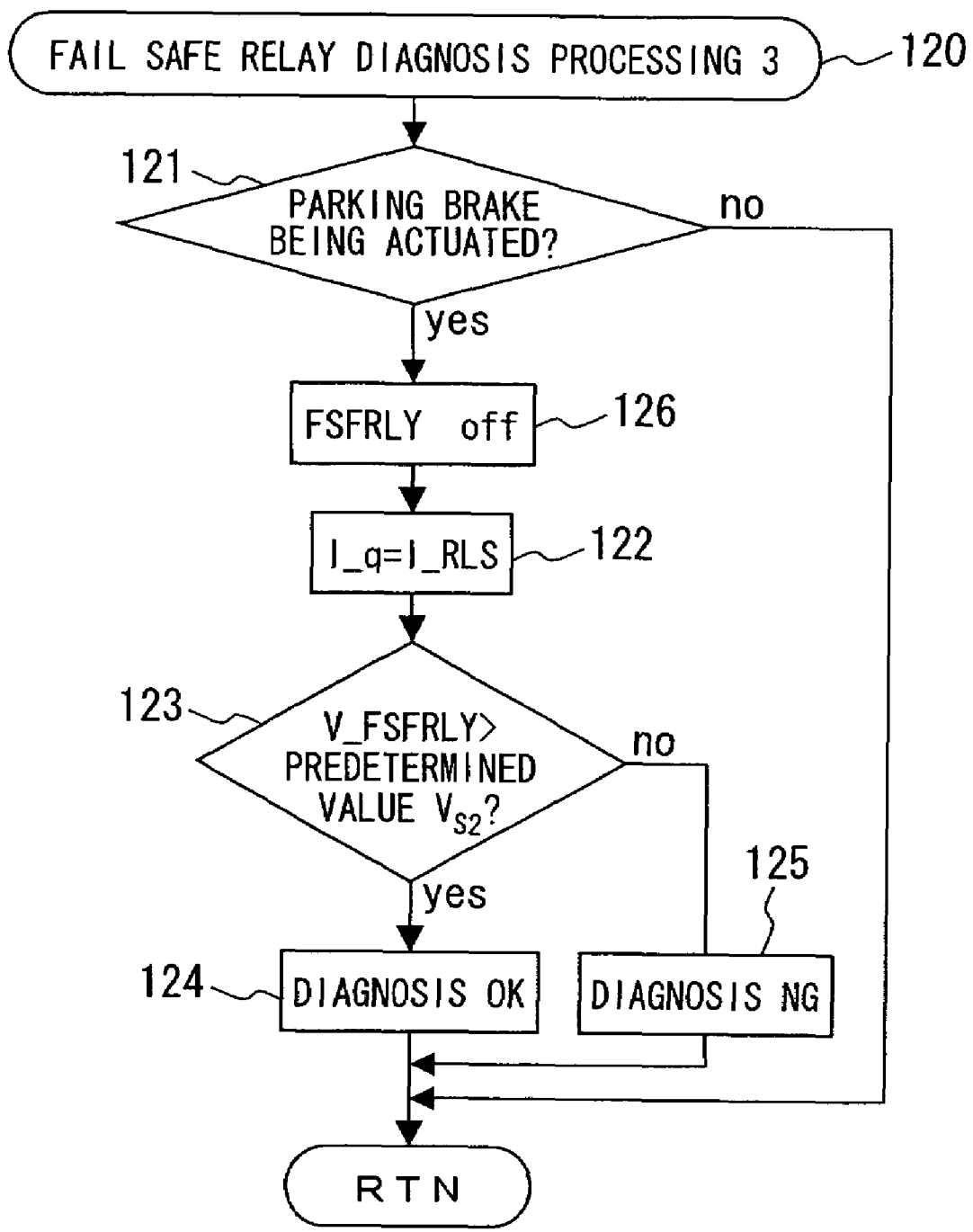
FIG. 13 is a flowchart showing an off-fixation diagnosis processing operation for the fail safe relay.

A method for performing a diagnosis of the fail safe relay 26, particularly a diagnosis of off-fixation of the fail safe relay, will now be described using FIG. 13. FIG. 13 is a flowchart showing an off-fixation diagnosis processing operation for the fail safe relay. The off-fixation of the fail safe relay 26 refers to a failure in which a contact point is fixed on the off-side. For fail safe relay diagnosis processing 3 in FIG. 13, fail safe relay diagnosis processing 120 is performed when the vehicle makes a transition from a driving state to a rest state. Whether or not the parking brake is being actuated is determined in processing 121.

When a braking force by the parking brake is generated and reaches a braking force within a specified level, the braking force is mechanically retained by the locking mechanism 10. Even if in this state, passage of a current through the motor 2 is interrupted, the braking force does not decrease. Namely, even if in a state in which the parking brake is retained, the fail safe relay 26 is turned on in processing 126, the braking force is retained. In this state, a current command value (q axis current) is given from the CPU 21 to the inverter 23 to rotate the motor in a direction leading to an increase in braking force. The current command value is determined based on a time period over which the capacitor 24 of FIG. 3 charged with electric charges is discharged.

After the current command value is given, a terminal voltage V_FSFRLY of the fail safe relay 26 is monitored and determined whether the terminal voltage is greater than a predetermined value $V_{S2}$ in processing 123. The predetermined value $V_{S2}$ is a minimum voltage capable of driving the motor 2, and is set to, for example, 8 V in a 14 V system electric power supply. If the terminal voltage is greater than the predetermined value $V_{S2}$, the fail safe relay off-fixation diagnosis is determined to be OK in processing 124. Conversely, the terminal voltage V_FSFRLY of the fail safe relay is monitored, and if the terminal voltage is equal to or less than the predetermined value $V_{S2}$, the fail safe relay off-fixation diagnosis is determined to be NG.

Even if the fail safe relay is off-fixed when a diagnosis of the fail safe relay 26 is performed in this way, the driving stability, the reliability of the vehicle and the lifetime are not adversely affected because the motor 2 rotates in a direction leading to an increase in braking force within a braking force generated by the parking brake, and therefore for the vehicle, the braking force of the parking brake already actuated only slightly increases within a specified range. If the fail safe relay is off-fixed, namely the diagnosis is determined to be NG, a warning is preferably given by a warning lamp, a buzzer or the like. Thus, an off-fixation failure of the fail safe relay can be easily diagnosed in a short time only by giving the current command value (q axis current) to the motor to determine whether the terminal voltage V_FSFRLY of the fail safe relay is greater than $V_{S2}$ by fail safe relay diagnosis processing 120. In processing 122, a d axis current may be made to pass. In this way, an off-fixation diagnosis of the fail safe relay can be performed without generating a torque in a direction of rotation of the motor.

Figure 14:
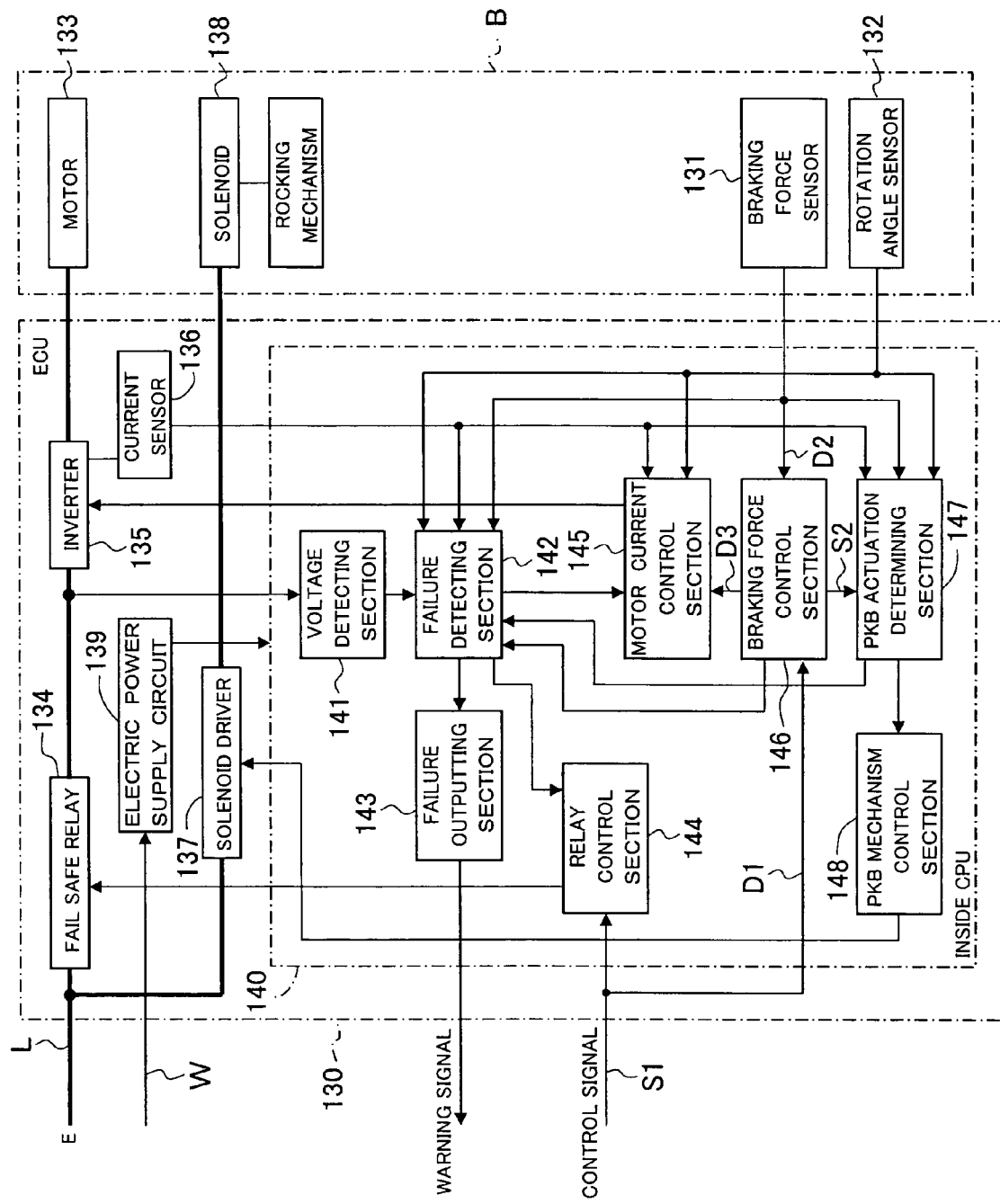
FIG. 14 is a block diagram showing the specifics of control performed in the control unit in a control apparatus performing a failure diagnosis of the electrically powered brake system.

An embodiment of a control unit performing a failure diagnosis of the electrically powered brake system will now be described with reference to FIG. 14. FIG. 14 is a block diagram showing the configuration of a control unit. In FIG. 14, a control unit (ECU) 130 has a function of driving a motor 133 as an electrically powered actuator based on a signal output from a braking force sensor 131 and a rotation angle sensor 132 of the electrically powered brake apparatus B, and a function of detecting a failure and generating a warning signal.

A fail safe relay 134 and an inverter 135 for supplying an electric power to the motor is provided in the control unit 130. The fail safe relay 134 interrupts a current from an electric power supply E to the motor 133 driving the electrically powered brake apparatus B. An electric power supply line L is connected to the fail safe relay 134, and connected from the fail safe relay to the motor 133 through the inverter 135 to supply an electric power to the motor. A current sensor 136 detecting a current of the inverter 135 is provided. An electric power is supplied to a solenoid 138 driving a locking mechanism through a solenoid driver 137 connected to a diverged electric power supply line.

Further, in the control unit 130, an electric power is supplied to electric power supply circuit 139 through a wake-up electric power supply line W in a vehicle. A stable electric power supply outputted from the electric power supply circuit 139 is supplied to the CPU 140. As described above, an electric power required for actuating the CPU 140 can be maintained by separately providing an electric power supplied through the fail safe relay 134 from an electric power supply without the aid of the fail safe relay 134 (i.e., an electric power supplied through the wake-up electric power line), even when the fail safe relay 134 is turned off after the diagnosis of fail safe relay. In this way, communication processing between the CPU 140 in the control unit 130 and another controlling device can be performed. Further, the CPU 140 can output an alarm signal to another controlling device.

A CPU 140 in the control unit 130 has a voltage detecting section 141, a failure detecting section 142, a failure outputting section 143, a relay control section 144, a motor current control section 145, a braking force control section 146, a PKB actuation determining section 147 and a PKB mechanism control section 148. The failure detecting section 142, the details of which will be described later, has a relay failure detecting section detecting a failure of the fail safe relay 134, a braking force sensor failure detecting section detecting a failure of the braking force sensor 131, a rotation angle sensor failure detecting section detecting a failure of the rotation angle sensor 132, and a current sensor failure detecting section detecting a failure of the current sensor 136, a failure diagnosis is performed by these failure detecting sections, and a warning signal is sent via the failure outputting section 143 to, for example, a driver.

The relay control section 144 controls the fail safe relay 134 based on a control signal S1 from, for example, a host control unit. The voltage detecting section 141 detects a voltage of the fail safe relay 134 and supplies the voltage to the failure detecting section 142 to perform a failure diagnosis of the fail safe relay 134.

Data of a thrust force applied to a brake pad is supplied to the failure detecting section 142, the braking force control section 146 and the PKB actuation determining section 147 from the braking force sensor 131 detecting a thrust force of the electrically powered bake apparatus B. Similarly, a signal from the rotation angle sensor 132 detecting a rotation angle of the motor of the electrically powered brake apparatus B is supplied to the failure detecting section 142, the braking force control section 146 and the PKB actuation determining section 147. In addition, a current value from the current sensor 136 is supplied to the failure detecting section 142, the motor current control section 145 and the PKB actuation determining section 147.

The braking force control section 146 compares, for example, braking force data D1 of the control signal S1 with actual braking force data D2, performs computation, and outputs current command data D3 necessary for an actual braking force to follow a command braking force to the motor current control section 145. The motor current control section 145 controls the inverter 135 supplying a current to the motor 133 based on the current command data D3. In addition, the braking force control section 146 supplies the braking force command signal S2 to the PKB actuation determining section 147.

The PKB actuation determining section 147 receives signals from the braking force sensor 131, the rotation angle sensor 132 and the current sensor 136 to determine an actuation state of the parking brake (PKB). A signal from the PKB actuation determining section 147 is supplied to the failure detecting section 142 and the PKB mechanism control section 148. The solenoid driver 137 is driven by an output from the PKB mechanism control section 148. The failure detecting section 142 performs a failure diagnosis of these sensors with a signal from the PKB actuation determining section 147 and signals from the braking force sensor 131 and the rotation angle sensor 132. In addition, the failure detecting section 142 performs a failure diagnosis of the current sensor 136 and also performs a failure diagnosis of the fail safe relay 134.

Figure 7:
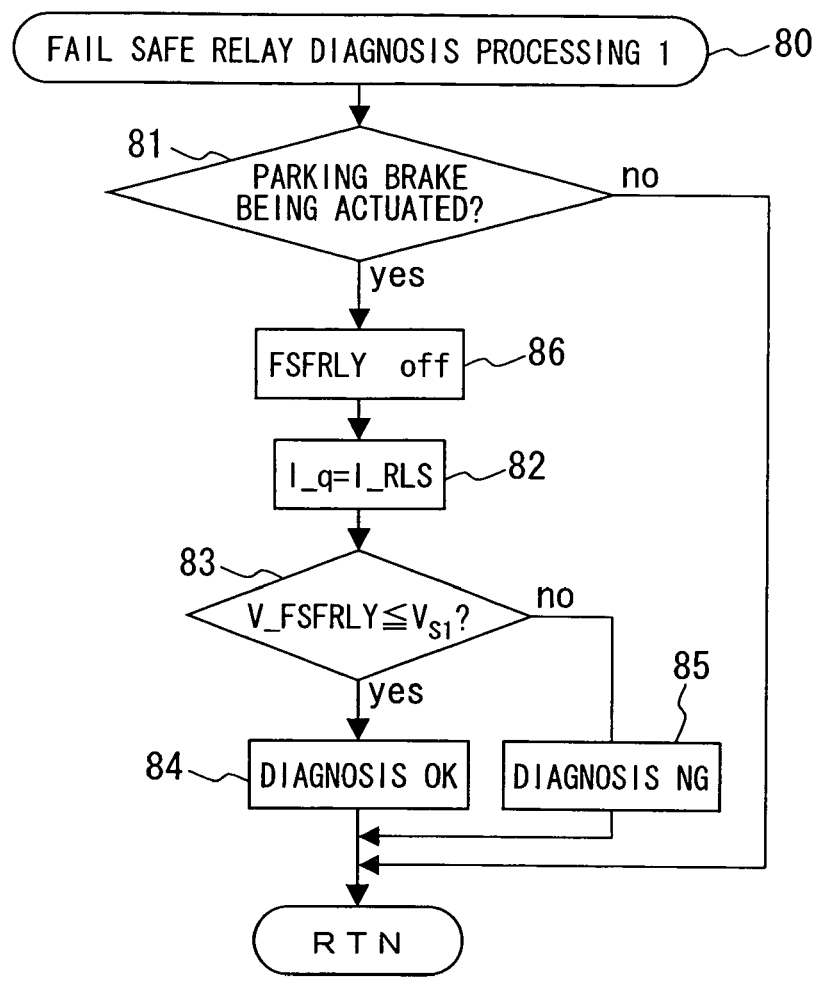
FIG. 7A is a flowchart showing a diagnosis processing operation for a fail safe relay of the electrically powered brake system.
FIG. 7B is a flowchart showing a diagnosis end interruption processing operation.
Figure 7:
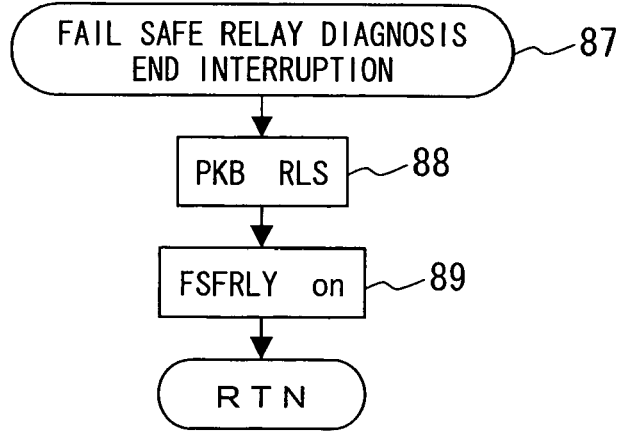

By the control unit 130 thus configured, the aforementioned diagnosis processing 1 (80) for the fail safe relay 136 shown in FIG. 7, the fail safe relay diagnosis processing 2 (90) shown in FIG. 8, the braking force and rotation angle sensor diagnosis processing (100) shown in FIG. 9, the current sensor diagnosis processing (110) shown in FIG. 11 and the fail safe relay diagnosis processing 3 (120) shown in FIG. 13 are performed.

Figure 15:
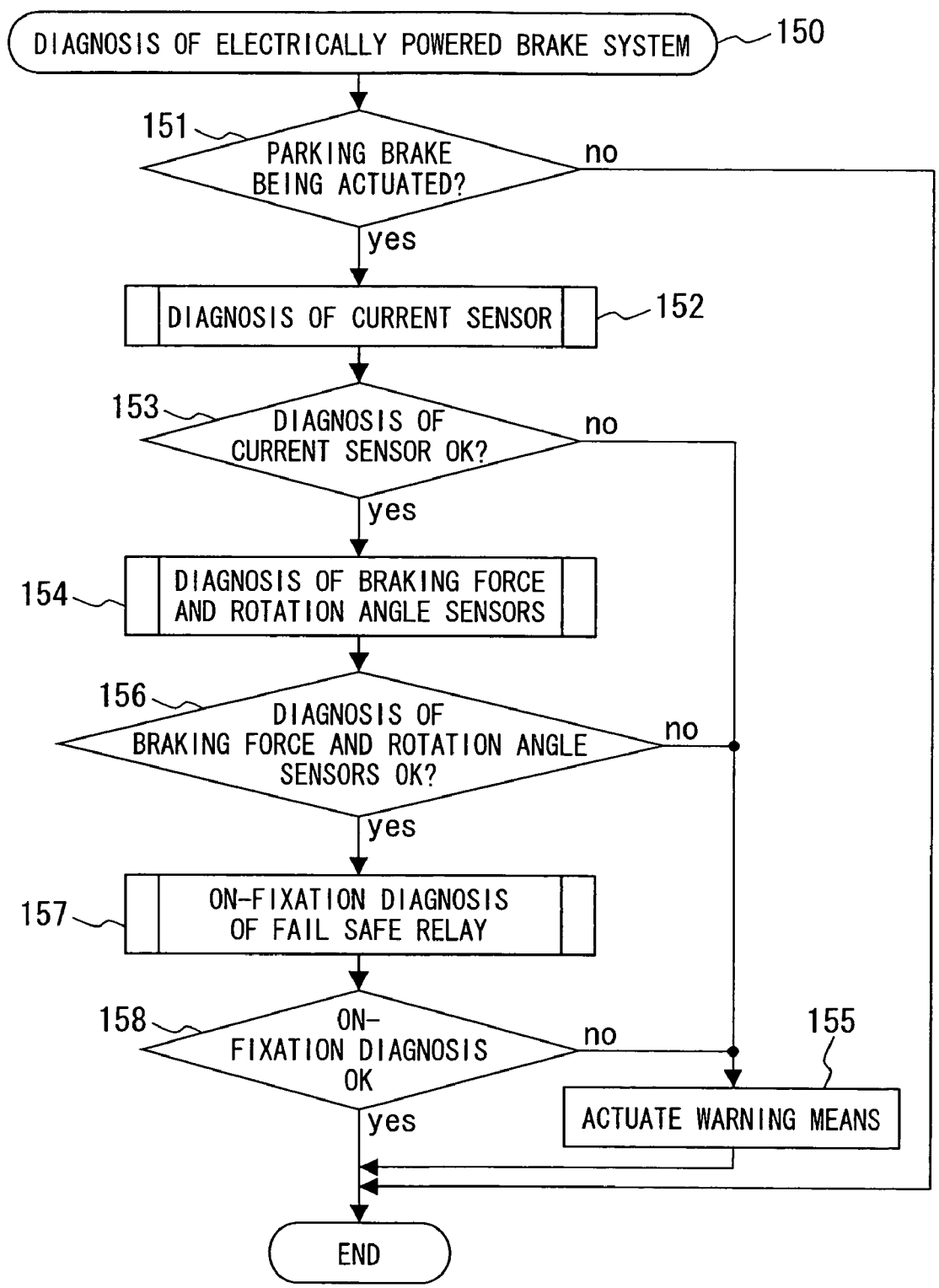
FIG. 15 is a flowchart showing an order of various kinds of diagnosis processing.

An embodiment regarding an order in which the aforementioned fail safe relay diagnosis processing, braking force sensor and rotation angle sensor diagnosis processing and current sensor diagnosis processing are performed will now be described with reference to FIG. 15. By performing various kinds of processing described above in a preferred order, a failure diagnosis of the electrically powered brake system can be completed effectively and in a short time, and wear of contact points of the fail safe relay can be reduced, thus making it possible to improve the durability of the fail safe relay. FIG. 15 is a flowchart showing an order of diagnosis processing.

In FIG. 15, electrically powered brake system diagnosis processing 150 is performed by determining whether the parking brake is being actuated in processing 151. If the parking brake is being actuated in processing 151, a diagnosis of the current sensor is performed in processing 152. If the parking brake is not being actuated in processing 151, processing is ended without performing subsequent processing. The current sensor diagnosis processing 152 is performed in accordance with the flowchart shown in FIG. 11. If the current sensor diagnosis is determined to be OK in processing 153, braking force and rotation angle sensor diagnosis processing is performed in processing 154. If the current sensor diagnosis is determined to be not OK in processing 153, a warning is given in processing 155, and processing is ended without performing subsequent diagnosis processing.

The braking force and rotation angle sensor diagnosis processing 154 is performed in accordance with the flowchart shown in FIG. 9. Braking force and rotation angle sensor diagnosis processing is performed in processing 154, and if the diagnosis result is determined to be OK in processing 156, fail safe relay on-fixation diagnosis processing is performed in processing 157. If the braking force and rotation angle sensor diagnosis is determined to be not OK in processing 156, a warning is given in processing 155, and processing is ended without performing subsequent processing.

The fail safe relay on-fixation diagnosis processing in processing 157 is performed in accordance with the flowchart shown in FIG. 7 or 8, and if the on-fixation diagnosis is determined to be OK in processing 158, processing is ended.

If the on-fixation diagnosis is determined to be not OK, a warning is given in processing 155, and processing is ended.

Namely, for the order of the aforementioned diagnosis processing, firstly whether the braking force is retained by the parking brake mechanism is checked based on the parking brake actuation command (processing 151), secondly a diagnosis of the current sensor is performed (processing 152), and then if the current sensor diagnosis is determined to be OK (processing 153), thirdly a diagnosis of the braking force sensor and the rotation angle sensor is performed (processing 154). If the diagnosis of the braking force sensor and the rotation angle sensor is determined to be OK (processing 156), fourthly an on-fixation diagnosis of the fail safe relay is performed (processing 157), and if the on-fixation diagnosis is determined to be OK (processing 158), processing is then ended. If the diagnosis is determined to be not OK in processing 153, 156 and 158, a warning is given and processing is ended.

By performing a diagnosis of the current sensor, followed by performing a diagnosis of the braking force sensor and the rotation angle sensor, followed by performing a fail safe relay on-fixation diagnosis in this way, the frequency of turning the relay on and off can be reduced to complete diagnosis processing in a short time. The on-fixation diagnosis is achieved by discharging residual electric charges of the absorbing capacitor 24 of the ripple of the fail safe relay and then detecting a voltage between terminals of the relay. If a diagnosis of sensors is subsequently performed, passage of a current through the motor is required, and therefore the aforementioned absorbing capacitor 24 should be charged with electric charges. Namely, by performing diagnoses in the order of this embodiment, time for charging the absorbing capacitor 24 (see FIG. 3) of the ripple of the fail safe relay with electric charges in midstream can be reduced, thus making it possible to complete processing in a short time. Time for each diagnosis processing is about several hundreds ms and time spent for all diagnosis processing is about several seconds.

Figure 16:
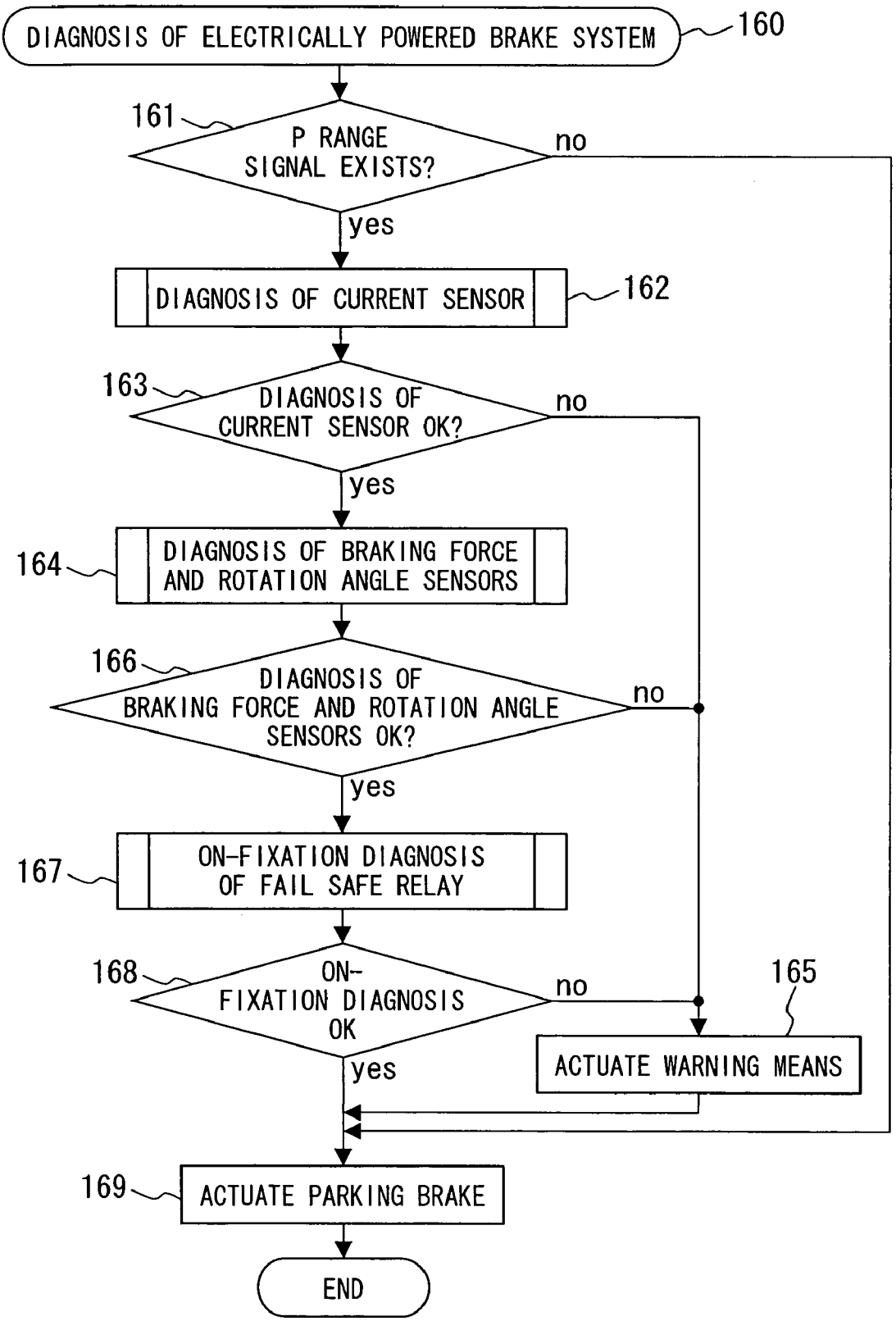
FIG. 16 is a flowchart showing an order of diagnosis processing when a shift lever is set to a P range.

Further, another embodiment for performing the aforementioned fail safe relay diagnosis processing, braking force sensor and rotation angle sensor diagnosis processing and current sensor diagnosis processing will be described with reference to FIG. 16. In this embodiment, timing for performing diagnosis processing for the electrically powered brake system is specified, whereby a failure diagnosis of the electrically powered brake system can be completed effectively and in a short time, and wear of contact points of the fail safe relay can be reduced, thus making it possible to improve the durability of the fail safe relay. FIG. 16 is a flowchart showing an order of diagnosis processing when a shift lever is set to a P range.

In FIG. 16, an electrically powered brake system diagnosis 160 is performed by determining whether a shift lever is in a P range in processing 161. If a P range position signal exists in processing 161, a current sensor diagnosis is performed in processing 162. If no P range position signal exists in processing 161, the parking brake is actuated in processing 169 and processing is ended without performing subsequent processing. The current sensor diagnosis processing 162 is performed in accordance with the flowchart shown in FIG. 11. If the current sensor diagnosis is determined to be OK in processing 163, braking force and rotation angle sensor diagnosis processing is performed in processing 164. If the current sensor diagnosis is determined to be not OK in processing 163, a warning is given in processing 165, the parking brake is actuated in processing 169, and processing is ended.

After current sensor diagnosis processing, braking force and rotation angle sensor diagnosis processing is performed, and if the diagnosis result is determined to be OK in processing 166, fail safe relay on-fixation diagnosis processing is performed in processing 167, as in the case of the aforementioned embodiment in FIG. 15. If the braking force and rotation angle sensor diagnosis is determined to be not OK in processing 166, a warning is given in processing 165, the parking brake is actuated in processing 169, and processing is ended. If the on-fixation diagnosis is determined to be OK in processing 168, the parking brake is actuated in processing 169 and processing is ended. If the on-fixation diagnosis is determined to be not OK, a warning is given in processing 165, the parking brake is actuated in processing 169 and processing is ended.

In this diagnosis processing, various kinds of failure diagnoses act in a direction leading to generation of a braking force, and therefore an operation for the diagnosis can be also used as a braking force necessary for actuating the parking brake. Thus, wasteful electric power consumption can be prevented, and a failure diagnosis can be performed in a short time. The parking brake is actuated at the end of diagnosis processing, whereby the vehicle can be stopped stably.

Figure 17:
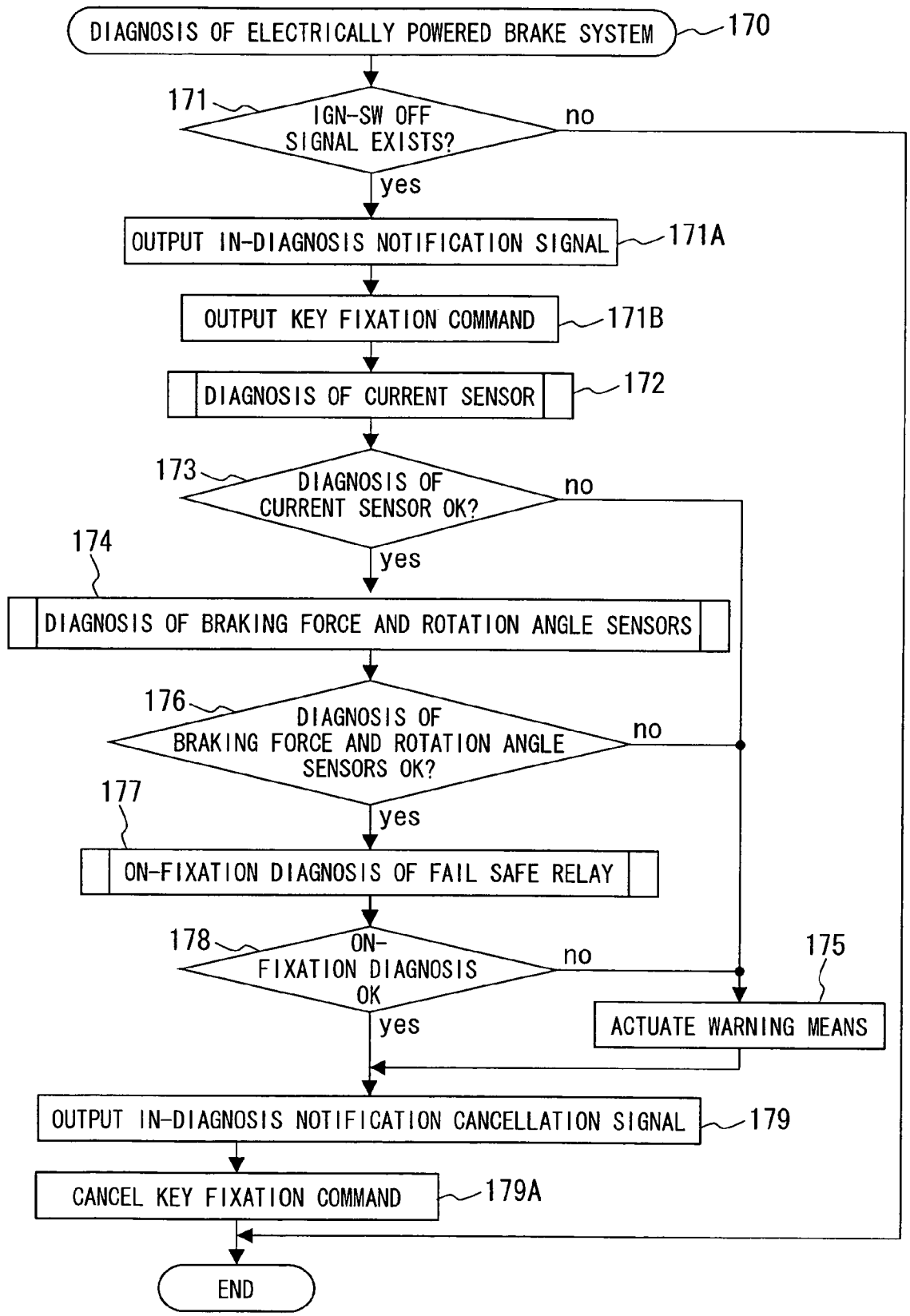
FIG. 17 is a flowchart showing an order of diagnosis processing when an ignition switch is set to off.

Further, another embodiment for performing the aforementioned fail safe relay diagnosis processing, braking force sensor and rotation angle sensor diagnosis processing and current sensor diagnosis processing when receiving an ignition switch (IGN-SW) off signal will be described with reference to FIG. 17. In this embodiment, timing for performing diagnosis processing for the electrically powered brake system is specified, whereby a failure diagnosis of the electrically powered brake system can be completed effectively and in a short time, and wear of contact points of the fail safe relay can be reduced, thus making it possible to improve the durability of the fail safe relay. FIG. 17 is a flowchart showing an order of diagnosis processing when an ignition switch is set to off.

In FIG. 17, an electrically powered brake system diagnosis 170 is performed by determining whether the ignition switch is off in processing 171. If the ignition switch is off in processing 171, an in-diagnosis notification signal is output in processing 171A, a key fixation command is output in processing 171B to retain a state in which a key cannot be removed, and then current sensor diagnosis processing 172 is performed. If the ignition switch is not off in processing 171, processing is ended without performing subsequent processing. The current sensor diagnosis processing 172 is performed in accordance with the flowchart shown in FIG. 11. If the current sensor diagnosis is determined to be OK in processing 173, braking force and rotation angle sensor diagnosis processing is performed in processing 174 as in the case of the aforementioned embodiments in FIGS. 15 and 16. If the current sensor diagnosis is determined to be not OK in processing 173, a warning is given in processing 175, an in-diagnosis notification cancellation signal is output in processing 179, the key fixation command is cancelled in processing 179A, and processing is ended without performing subsequent processing.

After current sensor diagnosis processing, braking force and rotation angle sensor diagnosis processing is performed in processing 174, and if the braking force and rotation angle sensor diagnosis result is determined to be OK in processing 176, fail safe relay on-fixation diagnosis processing is performed in processing 177. If the braking force and rotation angle sensor diagnosis is determined to be not OK in processing 176, a warning is given in processing 175, and processing is ended after the aforementioned processing 179 and processing 179A. If the on-fixation diagnosis is determined to be OK in processing 178, a diagnosis cancellation signal is output in processing 179, key fixation is cancelled in processing 179A, and processing is ended. If the on-fixation diagnosis is determined to be not OK, a warning is given in processing 175, and diagnosis cancellation signals are output in processing 179 and processing 179A, key fixation is cancelled, and processing is ended.

In the failure diagnosis processing 170 of the electrically powered brake system thus configured, an off signal can be received to perform failure diagnosis processing when the ignition switch is turned off. The key is fixed so as not to shutdown the electric power supply during the diagnosis, and therefore diagnosis processing can be performed with the key held for about several seconds. In this way, a driver is warned of a need for a measure against a failure as early as possible, whereby the vehicle can be safely driven.

One embodiment of the present invention has been described in detail, but the present invention is not limited to the embodiment described above, and various design modifications may be made within the scope of the spirit of the present invention set out in claims. For example, an example in which electrically powered brake apparatuses having a parking brake are mounted on two rear wheels has been described, but the apparatuses may be mounted on two front wheels.

In addition, a conversion mechanism converting a rotary motion into a linear motion, and mechanical inverse input blocking means such as one-way clutch placed between the conversion mechanism and a motor, and transmitting a torque of the motor to the conversion mechanism when the torque is generated with a current passing through the motor but blocking the transmission of the torque from the conversion mechanism to the motor when no torque is generated with no current passing through the motor may be installed, so that the electrically powered brake system is released if an abnormality occurs in the motor.

As an example of use of the present invention, this electrically powered brake system may be mounted in place of the conventional hydraulic brake apparatus, air brake apparatus and the like, and may be applied for brakes of wheels of rail cars and aircrafts.

What is claimed is:

1. An electrically powered brake system comprising:
    a brake pad that presses against a disc rotor that rotates with a wheel;
    an electrically powered motor that generates a rotating torque;
    a conversion mechanism that generates a pressing force for pressing the brake pad based on the rotating torque generated by the electrically powered motor;
    a parking brake mechanism including a locking mechanism that mechanically retains the pressing force for pressing the brake pad;
    a rotation angle sensor that detects a rotation angle of the electrically powered motor;
    a braking force sensor that measures a braking force of the brake pad;
    an electric current sensor that measures a value of an electric current for driving the electrically powered motor; and
    a control unit that generates the electric current for driving the electrically powered motor and performs a diagnosis, wherein
    the control unit comprises:
        an electric current control portion that generates the electric current for driving the electrically powered motor based on braking force data and an output of the electric current sensor,
        a parking brake actuation determining portion for detecting a parked state of a vehicle whereby the parking brake mechanism is actuated,
        a braking force sensor failure detecting portion that detects a failure of the braking force sensor;
        an electric current sensor failure detecting portion that detects a failure of the electric current sensor, and
        a braking force sensor failure outputting portion that outputs a failure detection result of the braking force sensor failure detecting portion to outside of the control unit, wherein
    the braking force sensor failure detecting portion performs a failure detection of the braking force sensor when it is detected by the parking brake actuation determining portion that the vehicle is in the parked state, and
    the electric current sensor failure detecting portion measures the output of the electric current sensor when it is detected by the parking brake actuation determining portion that the vehicle is in the parked state, and detects an abnormality in the electric current sensor based on whether or not the output value of the electric current sensor falls within a predetermined range.

2. The electrically powered brake control unit according to claim 1,
    wherein the braking force sensor failure detecting portion includes a storage portion that stores a braking force at a time when actuation of the parking brake mechanism is detected by the parking brake actuation determining portion, supplies a predetermined current to the electrically powered motor from the electric current control portion, and detects a failure of the braking force sensor based on a comparison between the braking force stored in the storage portion and a braking force measured by the braking force sensor after the predetermined current is supplied.

3. The electrically powered brake system according to claim 2,
    wherein the predetermined current supplied to the electrically powered motor from the electric current control portion of the control unit has an electric current value that causes a braking force greater than the braking force retained by the parking brake mechanism but smaller than the maximum braking force tolerated by the electrically powered brake system, and is a q axis current.

4. An electrically powered brake system comprising:
    a brake pad that presses against a disc rotor that rotates with a wheel;
    an electrically powered motor that generates a rotating torque;
    a conversion mechanism that generates a pressing force for pressing the brake pad based on the rotating torque generated by the electrically powered motor;
    a parking brake mechanism including a locking mechanism that mechanically retains the pressing force for pressing the brake pad;
    a rotation angle sensor that detects a rotation angle of the electrically powered motor;
    an electric current sensor that measures a value of an electric current for driving the electrically powered motor;
    a control unit that generates the electric current for driving the electrically powered motor and performs a diagnosis,
    wherein the control unit includes an electric current control portion that generates the electric current for driving the electrically powered motor based on braking force data and an output of the electric current sensor, an electric current sensor failure detecting portion that detects a failure of the electric current sensor when the parking brake actuation determining portion detects actuation of a parking brake mechanism, and an electric current sensor failure outputting portion that outputs a detection result of the electric current sensor failure detecting portion to outside of the control unit, wherein in the parked state of the vehicle, the electric current control portion stops supplying the drive current to the electrically powered motor, and in a state where the supplying of the drive current to the electrically powered motor is stopped, the electric current sensor failure detecting portion measures the output of the electric current sensor, and detects an abnormality in the electric current sensor based on whether or not the output value of the electric current sensor falls within a predetermined range.

5. The electrically powered brake control unit according to claim 4, wherein the electric current control portion that generates the electric current supplied to the electrically powered motor supplies a predetermined current to the electrically powered motor in the parked state of the vehicle, and the electric current sensor failure detecting portion detects a failure of the electric current sensor based on a change in an electric current value of the electric current sensor after the predetermined current is supplied by the electric current control portion.

* * * * *